United States Patent [19]
Craft et al.

[11] Patent Number: 5,438,666
[45] Date of Patent: * Aug. 1, 1995

[54] SHARED MEMORY BUS SYSTEM FOR ARBITRATING ACCESS CONTROL AMONG CONTENDING MEMORY REFRESH CIRCUITS, PERIPHERAL CONTROLLERS, AND BUS MASTERS

[75] Inventors: Thomas W. Craft; Bradley T. Herrin, both of El Toro; Thomas E. Ludwig, Irvine, all of Calif.

[73] Assignee: AST Research, Inc., Irvine, Calif.

[*] Notice: The portion of the term of this patent subsequent to Jan. 22, 2008 has been disclaimed.

[21] Appl. No.: 908,441

[22] Filed: Jun. 30, 1992

Related U.S. Application Data

[63] Continuation of Ser. No. 614,082, Nov. 13, 1990, abandoned, which is a continuation of Ser. No. 231,765, Aug. 11, 1988, Pat. No. 4,987,529.

[51] Int. Cl.⁶ .............. G06F 13/12; G06F 13/18; G06F 13/26; G06F 13/36
[52] U.S. Cl. .................. 395/842; 395/293; 395/433; 364/228.1; 364/229.2; 364/230.01; 364/230.02; 364/238.3; 364/240.5; 364/242.9; 364/241.2; 364/242.31; 364/242.6; 364/242.7; 364/242.91; 364/292.92; 364/246.91; 364/DIG. 1
[58] Field of Search ................ 395/325, 425, 725

[56] References Cited
U.S. PATENT DOCUMENTS

| | | | |
|---|---|---|---|
| 3,678,463 | 7/1972 | Peters ........................ | 395/550 |
| 4,205,373 | 5/1980 | Shah et al. . | |
| 4,236,203 | 11/1980 | Curley et al. . | |
| 4,245,301 | 1/1981 | Rokutanada et al. . | |
| 4,263,648 | 4/1981 | Stafford et al. . | |
| 4,287,560 | 9/1981 | Forbes et al. . | |
| 4,293,908 | 10/1981 | Bradley et al. . | |
| 4,315,308 | 2/1982 | Jackson . | |
| 4,317,169 | 2/1982 | Panepinto et al. .......... | 395/425 |
| 4,493,036 | 1/1985 | Boudreau et al. .......... | 395/725 |
| 4,503,495 | 3/1985 | Boudreau .................... | 395/725 |
| 4,528,626 | 7/1985 | Dean et al. . | |
| 4,543,629 | 9/1985 | Carey et al. ............... | 395/325 |
| 4,556,952 | 12/1985 | Brewer et al. ............. | 395/425 |
| 4,558,412 | 12/1985 | Inoshita et al. . | |
| 4,597,054 | 6/1986 | Lockwood et al. ........ | 395/325 |
| 4,604,683 | 8/1986 | Russ et al. . | |
| 4,635,192 | 1/1987 | Ceccon et al. . | |
| 4,648,029 | 3/1987 | Cooper et al. . | |
| 4,669,079 | 5/1987 | Blum . | |
| 4,688,166 | 8/1987 | Schneider . | |
| 4,695,948 | 9/1987 | Blevins et al. . | |
| 4,703,420 | 10/1987 | Irwin ........................... | 395/800 |
| 4,716,523 | 12/1987 | Burrus, Jr. et al. . | |
| 4,719,569 | 1/1988 | Ludemann et al. . | |
| 4,723,204 | 2/1988 | Khera .......................... | 365/222 |
| 4,760,515 | 7/1988 | Malmquist et al. . | |
| 4,777,591 | 10/1988 | Chang et al. . | |
| 4,787,032 | 11/1988 | Culley ......................... | 395/725 |
| 4,802,118 | 1/1989 | Honda et al. .............. | 365/222 |
| 4,870,704 | 9/1989 | Matelan et al. . | |
| 4,884,234 | 11/1989 | Keys et al. .................. | 395/425 |
| 4,908,749 | 3/1990 | Marshall et al. . | |
| 4,979,099 | 12/1990 | Milia et al. ................. | 395/325 |

Primary Examiner—Jack B. Harvey
Assistant Examiner—Michael A. Whitfield
Attorney, Agent, or Firm—Knobbe, Martens, Olson & Bear

[57] ABSTRACT

An arbitration system for a shared address, data and control bus provides burst mode operations for transferring data between a peripheral device and memory via a bus master. The arbitration system is responsive to high priority bus activities, such as memory refresh cycles and DMA cycles to temporarily transfer control of the shared bus from the bus master to a circuit controlling the high priority activity. After the high priority activity is completed, the arbitration system returns control of the shared bus to the bus master so that the associated peripheral device may continue operating in the burst mode. This transfer of control occurs without requiring the time overhead of arbitrating priority between bus masters having active bus requests. The arbitration system further includes timing circuits to assure that a bus master transferring data in the burst mode does not retain control of the shared bus for an excessive amount of time.

1 Claim, 14 Drawing Sheets

SHARED MEMORY BUS SYSTEM FOR ARBITRATING ACCESS CONTROL AMONG CONTENDING MEMORY REFRESH CIRCUITS, PERIPHERAL CONTROLLERS, AND BUS MASTERS

This application is a continuation of application Ser. No. 07/614,082, filed Nov. 13, 1990, which is a continuation of application Ser. No. 07/231,765, now U.S. Pat. No. 4,987,529, filed Aug. 11, 1988.

BACKGROUND OF THE INVENTION

1. Field of the Invention

The present invention is related to microprocessor-based computers, and, more particularly, to computers having a shared address, data and control bus for providing access to a memory storage unit to store instructions and data therein and to retrieve instructions and data therefrom. Specifically, the present invention is related to bus arbitration units that determine which of many devices is granted access to a shared bus, such as an AT-type shared bus as used in an IBM ®PC-AT or a compatible computer system.

2. Description of the Related Art

There are many types of computers ranging in size and performance from relatively inexpensive hand-held calculators to large and powerful "mainframe" computers costing millions of dollars. The present invention relates to a type of computer system that is commonly referred to as a microprocessor-based computer system and is often referred to as a "personal computer", or PC, although such microprocessor-based computer systems are used more and more frequently in business, industry, government and other applications where minicomputers and smaller mainframe computers were previously used. As used herein, a microprocessor-based computer system refers to a computer system that comprises a mass-produced integrated circuit microprocessor, such as, for example, the Intel ® 80×86 family (i.e., the 8086, the 80286, the 80386, and other integrated circuits). The integrated circuit microprocessor provides the computational power for such a computer system, but it will be understood by one skilled in the art that the successful operation of such a computer system depends upon a number of supporting circuits that control the data inputs and outputs to and from the microprocessor and that provide the microprocessor with sequences of instructions to perform.

In a typical computer system based upon the 80286 microprocessor, for example, the memory of the computer system is the focal point of the system rather than the microprocessor. The microprocessor retrieves instructions and data from the memory and stores data into the memory. The memory of the computer system typically comprises read-only memory (ROM) that is non-volatile and that provides the microprocessor with instructions when the computer system is first powered up or immediately after the computer system is reset. The memory of the computer system also includes random access read/write memory (RAM) that provides substantially larger amounts of data storage. In addition to the microprocessor, various other devices, such as a floppy disk controller, transfer data directly to and from the memory.

In some larger computer systems, such as many mainframe computers, the memory was a separate unit from the processor and other devices that used the memory. In order to provided access to the memory, each of the users, including the processor, is provided with a port to the memory by which address and data are transferred to and from the memory. The memory unit typically has its own control unit to select the device to be provided access at any one time and to provide any necessary memory management functions, such as memory refresh, as in the case of dynamic RAM. Access to the memory in such a manner is commonly referred to as direct memory access (DMA), and this term is generally used to refer to as providing access to the memory without having to transfer data through the microprocessor. For example, in many input/output devices, such as a disk drive, the data transfer rates are often too fast to be handled by the processor. Furthermore, the overhead of having the processor handle the input and output is undesirable as the processor in such large mainframe systems can continue to process other data, perhaps to and from another bank of memory.

In the considerably smaller microprocessor-based computer systems that are the subject of the present application, the memory of the computer system is not a separate unit. Rather, the memory typically resides in the same enclosure as the microprocessor and other devices and is coupled to the microprocessor and other devices by a shared address, data and control bus. As is well known in the art, the address, data and control bus is the heart of the entire computer system. In order for the microprocessor to operate, it must apply the address of an instruction to the shared bus and receive an instruction or series of instructions from the memory via the same shared bus. Thereafter, during the course of executing an instruction, the microprocessor will typically transfer bytes of data to and from the memory via the same shared bus. Furthermore, as set forth above, other devices, such as a floppy disk controller, or the like, transfer data directly to and from the memory via the same shared bus. Finally, the typically read/write memory in a microprocessor-based computer system is dynamic memory. Such a memory retains the data stored therein for only a short amount of time unless the data is "refreshed" by periodically accessing certain sequential addresses in the integrated circuits that comprise the dynamic memory in so-called refresh cycles. Although data is generally not transferred to and from the memory during these refresh cycles, it is necessary in some systems to apply an address to the shared bus as part of a refresh cycle. The microprocessor-based computer system includes refresh circuitry that controls the timing and selection of addresses to periodically refresh the dynamic memory circuits.

In order to provide access to the memory by each of the users (i.e., the microprocessor, the refresh circuitry, the floppy disk controller, and other users), each of the users includes bus interface circuits that are connected to the bus at the same time, but which are activated at different times so that only a single user can affect the contents of the bus. Frequently, such interface circuits are so-called tri-state circuits that have an active state in which they operate to apply one of two logic levels to the shared bus and have an inactive state in which they present a high impedance to the shared bus and thus have no effect on the operation of the bus.

In order to assure that the interface circuits from only one user are active at any one time, a typical microprocessor-based system includes a bus arbitration circuit that receives bus requests from the users connected to the bus and selects one of the users to control the bus at any one time. When a user is granted control of the shared bus, the user operates in conjunction with the memory timing to apply addresses to the shared bus and to transfer data to or receive data from the memory via the shared bus.

It should be understood that in most microprocessor-based computer systems the microprocessor is the most intensive user of the shared bus. Thus, in the Intel 80×86 family of microprocessors, the microprocessor includes control signals that determine whether the microprocessor is exerting control over the shared bus or is relinquishing the shared bus to other users. In particular, the microprocessor and its associated clock and timing circuitry includes a HOLD control signal input which can be activated by a bus arbitration circuit, or the like, to indicate that another user is requesting access to the shared bus, and includes a HLDA (hold acknowledge) control signal output that indicates that the microprocessor has finished its current cycle and is willing to relinquish the shared bus, at least temporarily. When the HLDA control signal is received, the bus arbitration circuit grants control of the shared bus to the requesting user having the highest priority (e.g., the refresh circuit, the floppy disk controller circuit, and so on).

The foregoing bus arbitration scheme is sometimes referred to as "cycle stealing" because the bus arbitration circuit is stealing a memory cycle from the microprocessor and granting the memory cycle to another user on the shared bus. In known shared bus arbitration schemes, such cycle stealing is performed only one or a few cycles at a time. For example, the microprocessor has the control of the bus returned to it after the requesting user has accessed the bus for one or more predetermined memory cycles. This system of limiting the grant of the bus to only one or a few memory cycles has been used in known systems a means of preserving the operational integrity of the microprocessor-based computer system. If a user other than the microprocessor is granted control of the shared bus for an extended amount of time (i.e., a large number of memory cycles), the microprocessor would no longer have any control over the operation of the entire system. By returning control of the shared bus to the microprocessor on a periodic basis, the microprocessor can monitor the activities of the other users. More importantly, the microprocessor can process time critical data, such as clock interrupts, and the like.

Although the cycle-stealing arbitration system described above, has the advantage of being relatively immune from system failure caused by the loss of the shared bus by the microprocessor, such arbitration systems suffer from excessive time overhead. In other words, the time required for the bus arbitration circuitry to recognize a request from a user and send the HOLD control signal to the microprocessor; the time required for the microprocessor to recognize the HOLD control signal, finish its current cycle, relinquish the shared bus, and activate the HLDA control signal; the time required for the bus arbitration circuitry to grant control of the shared bus to the requesting user is lost time which becomes significant when accumulated over a large number of user requests. Furthermore, in systems having more than one user other than the microprocessor and the refresh circuitry, the other users must continually vie for priority to use the shared bus. Thus, in microprocessor-based computer systems, such as an AT-type computer system, where the memory refresh operation uses the shared bus, the so-called burst mode of data transfer, in which large quantities of data are transferred to and from the memory, is effectively unknown. Rather, such data is transferred one or two bytes at a time on a cycle stealing basis. The DMA provided by exemplary microprocessor-based computer systems is notoriously slow. In many microprocessor-based systems, the DMA is sufficiently slow that large amounts of data at high data rates, such as to and from a hard disk drive, are transferred through the microprocessor using programmed input and output rather than using the DMA provided by the known bus arbitration circuitry.

Thus, it can be seen that a need exists for an improved bus arbitration circuit that will provide faster and more efficient access to the shared address, data and control bus while maintaining the operational integrity of the microprocessor-based computer system.

SUMMARY OF THE INVENTION

An improved bus arbitration device for controlling access to a shared address, data and control bus is provided. The shared bus is connected to a memory to which data is transferred to be stored and from which data is retrieved. A microprocessor is connected to the shared bus. The microprocessor transfers data to and from the memory via the shared bus and receives stored instructions from the memory via the same bus. Other devices are also connected to the shared bus, such as a memory refresh circuit and a conventional peripheral controller operating to transfer data between the memory and a peripheral device such as a flexible disk drive unit. In addition to the conventional devices on the shared bus, provision is made for the addition for at least one, and preferably at least three, bus controller circuits.

Each of the bus controller circuits, referred to herein as a "bus master," provides an interface between the shared bus and one or more peripheral devices connected to the bus master. The bus arbitration circuit includes control signal inputs from each of the bus masters to indicate when a bus master is requesting access to the shared bus. The bus arbitration system responds to the request or requests from the bus masters, from the refresh circuitry and from the conventional DMA-based peripheral controller and determines which of the requesting devices has the highest priority. The bus arbitration system grants control of the shared bus to the master or other requester having the highest priority. The refresh circuitry or the conventional controller operate on the shared bus in a conventional manner, interleaving their bus operations with the microprocessor. On the other hand, when one of the bus masters obtains control of the shared bus, the bus master retains control of the shared bus for a sufficient amount of time to transfer bursts of data to or from the memory. The bus master retains control of the bus until its burst transfers are completed or until interrupted by a higher priority request from the refresh circuitry or the conventional peripheral device controller. In any event, the interruption is only for a short amount of time. Thereafter, the bus arbitration circuit transfers control of the shared bus back to the bus master so that the bus master may complete the burst transfer.

The bus arbitration circuit of the present invention includes logic for protecting the integrity of the shared bus so as to prevent a bus master from obtaining access to the shared bus and retaining control of the shared bus to the exclusion of the microprocessor. As one form of protection, the bus arbitration circuit monitors the interrupt requests to the microprocessor and grants control of the shared bus to the microprocessor so that the microprocessor can service the interrupt requests. The bus arbitration circuit monitors a signal indicative of the completion of the interrupt servicing by the microprocessor, and, when the interrupt servicing is complete, grants control of the shared bus to the requesting bus master having the highest current priority (i.e., it re-arbitrates the pending bus requests). In the event of plural interrupt requests to the microprocessor, the bus arbitration circuit counts the number of interrupt requests and counts the number of signals indicative of the completion of the interrupt servicing and determines that the microprocessor has concluded the servicing of all interrupts before returning control of the shared bus to a requesting bus master. In an alternative embodiment, the bus arbitration circuit will return control of the shared bus to the bus master that had control prior to the interrupt without requiring arbitration of requests from plural bus masters.

The bus arbitration circuit includes additional logic for providing "fair" access to the shared bus by the microprocessor. When a bus master has been granted access to the shared bus, a watchdog timer is set that generates a signal after a predetermined amount of time has elapsed. The predetermined amount of time is sufficient to permit the bus master to transfer bursts of data to or from the memory via the shared bus, thus reducing the time overhead, as discussed above. On the other hand, the predetermined amount of time is sufficiently short that the microprocessor will obtain control of the bus within a reasonable amount of time. When the predetermined amount of time has elapsed, the bus arbitration circuit will withdraw the grant of the shared bus to the currently controlling bus master. Thereafter, the control of the shared bus will be returned to the microprocessor. After the microprocessor has used the bus to execute instructions, the arbitration circuit will arbitrate the pending access requests from the bus masters, and, if more than one bus master is requesting access to the shared bus, will grant access to the bus master having the current highest priority. In preferred embodiments of the present invention, the access priority among the bus masters is rotated (i.e., changed) each time a bus master is granted access to the shared bus so that the bus master currently having control of the shared bus has the lowest priority when the arbitration circuit next arbitrates access to the shared bus by the bus masters.

Preferably, the bus arbitration circuit includes a second watchdog timer circuit that operates to the benefit of the microprocessor. If one or more of the bus masters are continually requesting access to the shared bus, it would be possible that the microprocessor would only be allowed to have access to the shared bus only long enough to handle interrupts. Thus, the microprocessor would be effectively precluded from the shared bus for conventional data processing operations and for monitoring the activities of other devices on the shared bus. The second watchdog timer circuit is included to prevent this condition from happening. The second watchdog timer provides a second timer signal input to the bus arbitration circuit. The second timer signal is activated when control of the shared bus is returned to the microprocessor and lasts for a second predetermined amount of time. During the second predetermined amount of time, the bus arbitration circuit precludes bus arbitration from occurring for the bus masters to thereby allow the microprocessor to have access to the shared bus without being interrupted by the bus masters. (The bus arbitration circuit will continue to honor refresh requests and DMA requests.) After the expiration of the second predetermined amount of time, the bus arbitration circuit will arbitrate any pending requests for access to the shared bus from the bus masters and grant the bus to the bus master having the current highest priority.

These and other features will be described more fully below in connection with the drawing figures.

DETAILED DESCRIPTION OF THE PREFERRED EMBODIMENT

Figure 1:
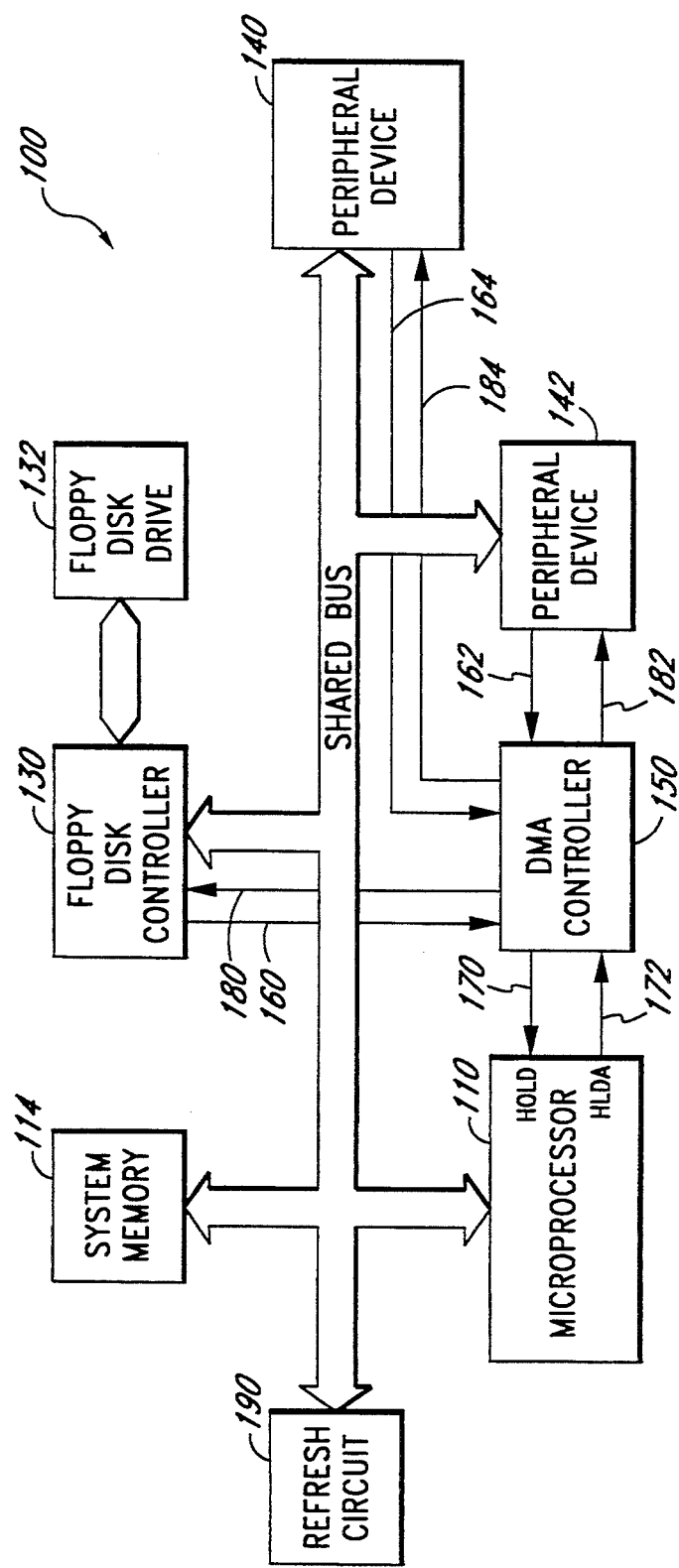
FIG. 1 is a block diagram of an exemplary AT-type computer system showing the interconnection of the components of the system to a shared address, data and control bus.

FIG. 1 is a block diagram of an exemplary computer system 100 such as may be used in conjunction with the bus arbitration circuit of the present invention. The computer system 100 described herein will be referred to as an "AT-type" bus architecture which refers to the type of bus interconnection system utilized by the IBM ® PC-AT ® and other computers offering compatible architectures. As illustrated, the computer system 100 includes a microprocessor 110, such as the INTEL ® 80286, the INTEL ® 80386, or an equivalent. The computer system 100 further includes a system memory 114 which provides storage for instructions and data for the microprocessor 110 and other elements of the computer system 100. As illustrated, the microprocessor 110 is connected to the system memory 114 via a shared address, control and data bus 118. Although not shown in detail herein, it should be understood that the shared bus 118 comprises separated signal lines for the address control signals (e.g., twenty-four address lines), for data lines (e.g., sixteen data lines) and control lines that control the timing of the application of addresses and data to the shared bus. The complete details of the shared bus can be found in the IBM ®PC AT ® *Technical Reference Manual,* available from International Business Machines, and in numerous other publications. In exemplary computer systems constructed in accordance with the AT-type bus architecture, the microprocessor 110 is not electrically connected directly to the share bus 118. Rather, a set of tri-state buffers (not shown) are interposed between the microprocessor 110 and the shared bus 118 to provide additional drive capability so that the microprocessor 110 does not have to provide sufficient output current on each signal line to drive a potentially large capacitive load. In addition, the tri-state buffers can be disabled into their high impedance states when the microprocessor 110 is not controlling the shared bus 118 so that the address, data and control signals from the microprocessor 110 have no effect on the shared bus 118.

As further illustrated in FIG. 1, additional devices are also generally connected to the shared bus 118. For example, an exemplary computer system 100 includes a floppy disk controller 130 which provides an interface between the shared bus 118 and a floppy disk drive unit 132. Such a floppy disk controller 118 operates in a known conventional manner to transfer data between the floppy disk drive unit 134 and the system memory 114. Such a floppy disk controller 130 includes bus drivers and receivers (not shown) that generally are tri-state devices. As with the tri-state buffers associated with the microprocessor 110, the tri-state buffers associated with the floppy disk controller 130 are enabled onto the shared bus 118 only when the floppy disk controller 130 has control over the shared bus 118. As will be discussed below, the floppy disk controller 130 is typically a DMA (direct memory access) device that transfers data to and from the system memory 114 without utilizing the input/output capabilities of the microprocessor 110.

Additional peripheral devices may be connected to the shared bus 118 in a manner similar to the floppy disk controller 130 via their respective device controllers. For example, a number of devices are specifically designed to interface directly with the AT-type shared bus 118. Two such devices are illustrated as PERIPHERAL DEVICES 140 and 142 in FIG. 1. Such devices may operate as DMA devices and control the shared bus 118 directly, in a manner similar to the floppy disk controller 130 through a conventional peripheral interface adapter, or the like.

The computer system 100 further includes a DMA controller circuit 150 which coordinates the use of the shared bus 118 and assures that no more than one device has control of the shared bus 118 at any one time. For example, the DMA controller circuit 150 in an exemplary IBM ® PC AT comprises a pair of 8237A four-channel direct memory access controller integrated circuits available from Intel Corporation, or the like. The DMA controller circuit 150 can receive DMA requests from each of seven DMA channels (in the AT-type computer systems, one of the eight DMA channels is typically reserved to interconnect the two DMA integrated circuits) and selectively grant control of the shared bus 118 to a device or controller associated with one of the channels.

In the IBM ® PC AT, the DMA controller circuit 150 serves as the interface between peripheral device controllers, such as the floppy disk controller 130, to permit the device controllers to gain access to the shared bus 118. Returning to the floppy disk controller 130, for example, in order to gain access to the shared bus 118 to transfer data to or from the system memory 114, the floppy disk controller 130 executes a DMA request signal on a DREQ line 160. The DREQ line 160 is connected to one of the DMA request inputs of the DMA controller circuit 150. In like manner, DREQ lines 162 and 164 are illustrated that interconnect the peripheral devices 140 and 142 to the DMA controller circuit 150. Additional DMA request lines (not shown) are available to interconnect additional peripheral devices. When the DMA controller circuit 150 receives a DMA request from the floppy disk controller 130 or from a device connected to one or more of the other DMA channels, the DMA controller circuit 150 prioritizes the pending active requests and grants control of the bus to the device associated with the request having the highest current priority. In the exemplary computer system 100 described herein. DMA channel 1 has a lower priority than DMA channel 0, DMA channel 2 has a lower priority than DMA channel 1, and DMA channel 3 and so on.

In order for the DMA controller circuit 150 to grant control of the shared bus 118 to one of the peripheral devices, the DMA controller circuit 150 must first request the microprocessor 110 to relinquish control of the shared bus 118. The DMA controller circuit 150 activates a HOLD control line 170 that is provided as an input to the microprocessor 110 to indicate to the microprocessor 110 that it should relinquish the shared bus 118 at the end of the current operation of the microprocessor 110. If the microprocessor 110 is able to honor the request, it will conclude its current operation, disable its associated bus drivers and activate a HLDA (hold acknowledge) control line 172 to indicates to the DMA controller circuit 150 that the shared bus 118 is available. Thereafter, the DMA controller circuit 150 will activate a DMA acknowledge line associated with the DMA channel having the current highest priority. For example, a DMA acknowledge (DACK) line 180, a DMA acknowledge line 182, and a DMA acknowledge line 184 are shown interconnecting the DMA controller circuit 150 with the floppy disk controller 130, the peripheral device 140 and the peripheral device 142, respectively. When the device (e.g., the floppy disk controller) receives an active signal on its respective DMA acknowledge line, the device can then enable its bus drivers and thereby control the shared bus 118. Thereafter, the device transfers data to or from the system memory 114 in a known conventional manner until the DMA controller circuit 150 deactivates the DMA acknowledge line. When the DMA acknowledge line is deactivated, the device must disable its bus drivers and relinquish control of the shared bus 118.

One other operation has to be taken into consideration before the DMA controller circuit 150 grants control of the shared bus 118 to one of the DMA devices. As previously discussed, the system memory 114 typically comprised dynamic RAM which must be periodically refreshed in order to maintain the integrity of the data in the memory. In order to perform the refresh operation, the computer system 100 includes a system memory refresh circuit 190 that is electrically connected to the system memory 114. The system memory refresh circuit 190 receives a periodic timer signal (e.g., every 15 microseconds) and blocks access to the shared bus 118 so that other devices cannot use the shared bus 118. The system memory refresh circuit 190 applies an address to the system memory 114 to cause the system memory to begin a memory cycle. No data is transferred to or from the system memory 114 during the refresh memory cycle.

Figure 2:
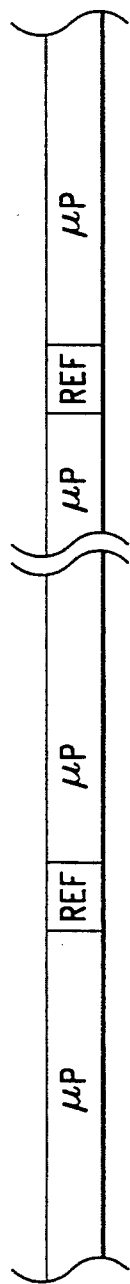
FIG. 2 is a timing diagram illustrating the interleaving of memory refresh cycles with the microprocessor system bus operations.
Figure 3:
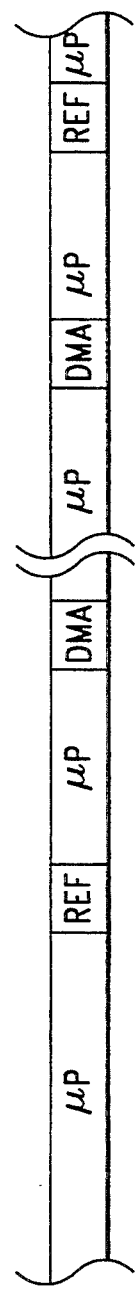
FIG. 3 is a timing diagram illustrating the interleaving of DMA operations with the microprocessor system bus operations and the memory refresh cycles.

The operation of the computer system 100 in providing DMA operations in addition to microprocessor operations and refresh operations is illustrated by timing charts 200 and 204 in FIGS. 2 and 3, respectively. The timing charts 200 and 204 show how the control of the shared bus 118 is allocated among the various bus users as a function of time. As illustrated by the timing chart 200, the microprocessor 110 (represented as "μP" in FIG. 2) typically has control for most of the time. The microprocessor 110 periodically relinquishes control of the shared bus 118 to allow the system memory refresh circuit 190 to perform a refresh cycle. The blocks of time used for the refresh cycles are illustrated by "REF" in FIG. 2. In the exemplary timing chart 200, the refresh cycles are spaced approximately 15 microseconds apart.

When a DMA operation is requested by a peripheral controller, such as the floppy disk controller 130, the timing chart 204 of FIG. 3 is representative of the allocation of the shared bus 118. As illustrated, the device performing the DMA operation is granted time on the bus more often than the refresh cycle. However, in an exemplary computer system 100, the microprocessor 110 does not relinquish the shared bus 118 to peripheral controller for an extended amount of time. Rather, the DMA controller circuit 150 is typically programmed in the single transfer mode so that the requesting peripheral controller is granted control of the shared bus 118 for only a single memory cycle so that each DMA cycle is interleaved with a memory cycle requested by the microprocessor 110. This mode of operation allows the microprocessor to maintain control over the operations of the computer system 100 since a peripheral controller cannot gain permanent control of the shared bus 118. As further illustrated, the memory refresh cycles continue to occur on a periodic basis and typically utilize a memory cycle that would be otherwise allocated to the peripheral controller.

The above-described DMA operations have been found to be sufficient to provide transfer of data to and from the system memory 114 by relatively slow devices such as floppy disk drives, and the like. However, because of the continual switching from one bus user to another bus user, the exemplary AT-type DMA control circuit 150 has been found to be inadequate to provide high-speed DMA operations such as are provided in large scale computer systems. In fact, in most AT-type systems using either the 80286 microprocessor or the faster 80386 microprocessor, the microprocessor 110 can use string I/O instructions (e.g., REP INSW and REP OUTSW) to transfer data between the system memory 114 and an input/output port at a faster rate than the DMA controller. Thus, many such AT-type computer systems utilized programmed input/output instructions to transfer sectors of data between the system memory and a hard disk controller to match the high data transfer rates of a typical hard disk. Of course, this imposes a large processing overhead on the microprocessor 100 and effectively defeats the purpose of having the DMA controller circuit 150 in the system. On the other hand, the DMA controller circuit 150 available in the exemplary AT-type computer system 100 does not provide the protection necessary to allow the DMA controller circuit 150 to operate in a block transfer mode.

Another problem that exists with the DMA controller circuit 150 in an exemplary AT-type computer system is that it has a fixed priority for determining which peripheral controller is granted access to the shared bus 118. Thus, if two or more peripheral devices are requesting access to the shared bus 118, the device associated with the peripheral controller having the highest priority will always gain access to the shared bus 118 to the exclusion of the other device.

Figure 4:
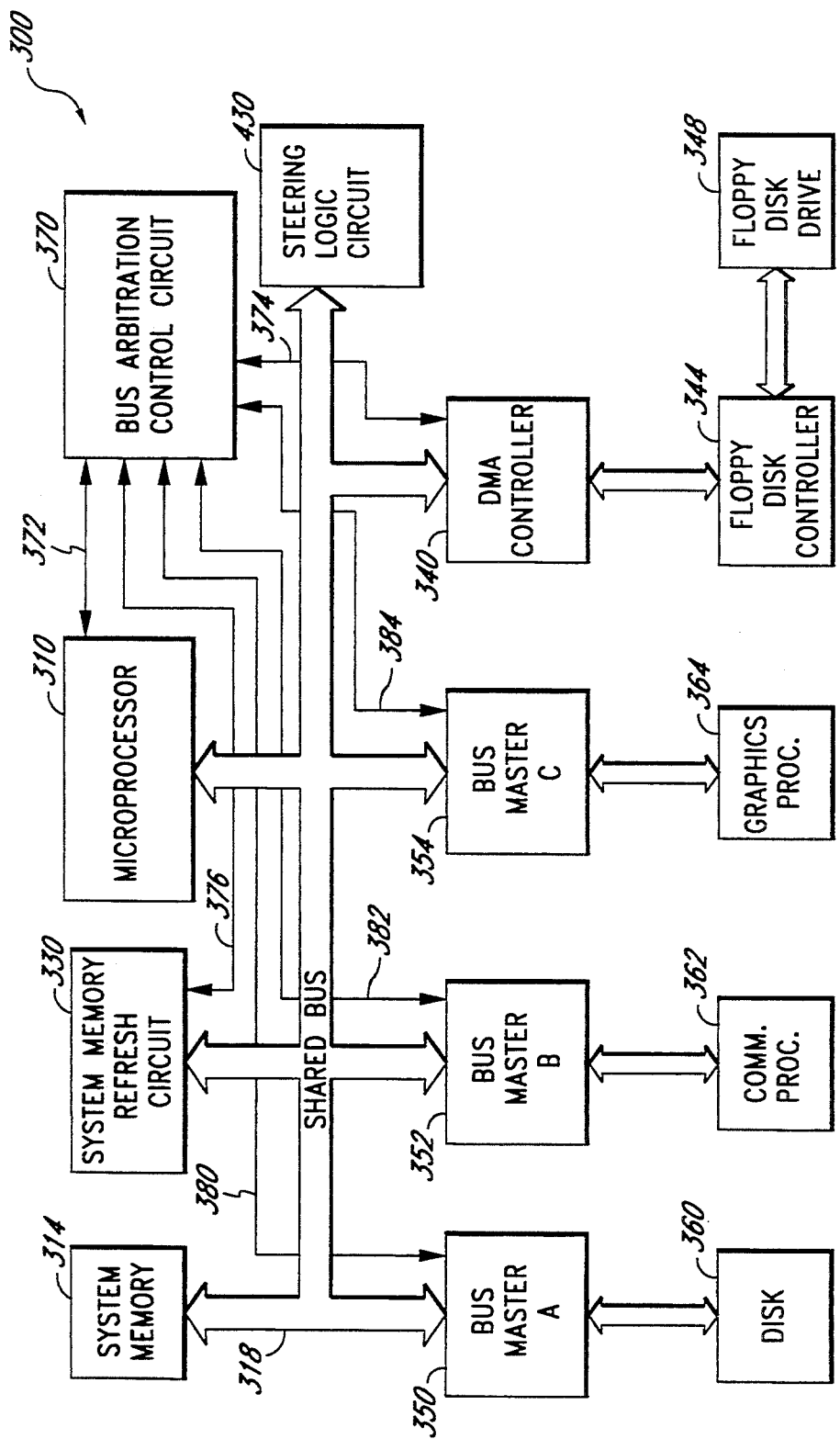
FIG. 4 is a block diagram of the computer system of the present invention including a plurality of bus masters that share the shared system bus and a bus arbitration control circuit that determines which system element has control of the shared bus.

FIG. 4 illustrates a block diagram of a preferred embodiment of a computer system 300 constructed in accordance with the present invention to solve the problems associated with direct memory access in the conventional AT-type computer system. As illustrated, the computer system 300 includes a microprocessor 310 (e.g., an Intel 80286, an Intel 80386, or the like) and a system memory that 314 that are interconnected by a shared bus 318. As before, buffer circuits (not shown) are advantageously interposed between the microprocessor 310 and the shared bus 318. A system memory refresh circuit 330 is provided to periodically refresh the system memory 114, as described above. A system board DMA controller circuit 340 is included to provide an interface between the computer system 300 and a floppy disk drive controller 344. The system board DMA controller 340 is included to provide compatibility with existing conventional software that assumes that the DMA controller circuit 340 is being used to control access to the shared bus 318 by the floppy disk controller 344. The floppy disk controller 344 is connected to a floppy disk drive 348, as before.

As further illustrated in FIG. 4, the computer system 300 includes a plurality of bus controller circuits referred to herein as bus masters. In preferred embodiments of the present invention, three bus masters are accommodated in the computer system 300 and they are identified as a BUS MASTER A 350, a BUS MASTER B 352 and a BUS MASTER C 354. Each of the bus masters can be connected to a peripheral data device so as to provide an interface between the peripheral data device and the shared bus 118 and thus to the system memory 114. For example, the bus master A 350 is illustrated as being connected to a high data rate disk drive 360; the bus master B 352 is illustrated as being connected to a communications co-processor 362; and the bus master C 354 is illustrated as being connected to a graphics co-processor 364. Although shown as separate units, it should be understood that a bus master and its associated peripheral device may be advantageously combined into one unit in some cases.

When it is necessary to transfer data between the system memory 314 and a peripheral device associated with one of the three bus masters, the respective bus master must obtain control of the shared bus 318, as before. However, unlike the previously discussed conventional AT-type computer system 100 of FIG. 1, the computer system 300 of the present invention does not utilize the DMA controller circuit 330 to control bus operations other than for the floppy disk controller 334. Rather, the computer system of the present invention includes a bus arbitration control circuit 370. As illustrated in FIG. 4, a set of control lines 372 connects the bus arbitration control circuit 370 to the microprocessor 310; a set of control lines 374 connects the bus arbitration control circuit 370 to the DMA controller circuit 334; a set of control lines 376 connects the bus arbitration control circuit 370 to the system memory refresh circuit 330; and sets of control lines 380, 382 and 384 connect the bus arbitration control circuit 370 to the bus master A 350, the bus master B 352 and the bus master C 354, respectively. As will be discussed in detail below, the bus arbitration control circuit 370 receives requests to use the shared bus 318 from the three bus masters 350, 352, 354, from the system memory refresh circuit 330 and from the DMA controller circuit 334 and grants control of the shared bus 318 to the requester having the current highest priority. As previously discussed, each of the devices having access to the shared bus 318 has bus drivers which are preferably tri-state drivers that are activated only when the bus arbitration control circuit 370 grants control of the shared bus 318 to the respective device.

Figure 5:
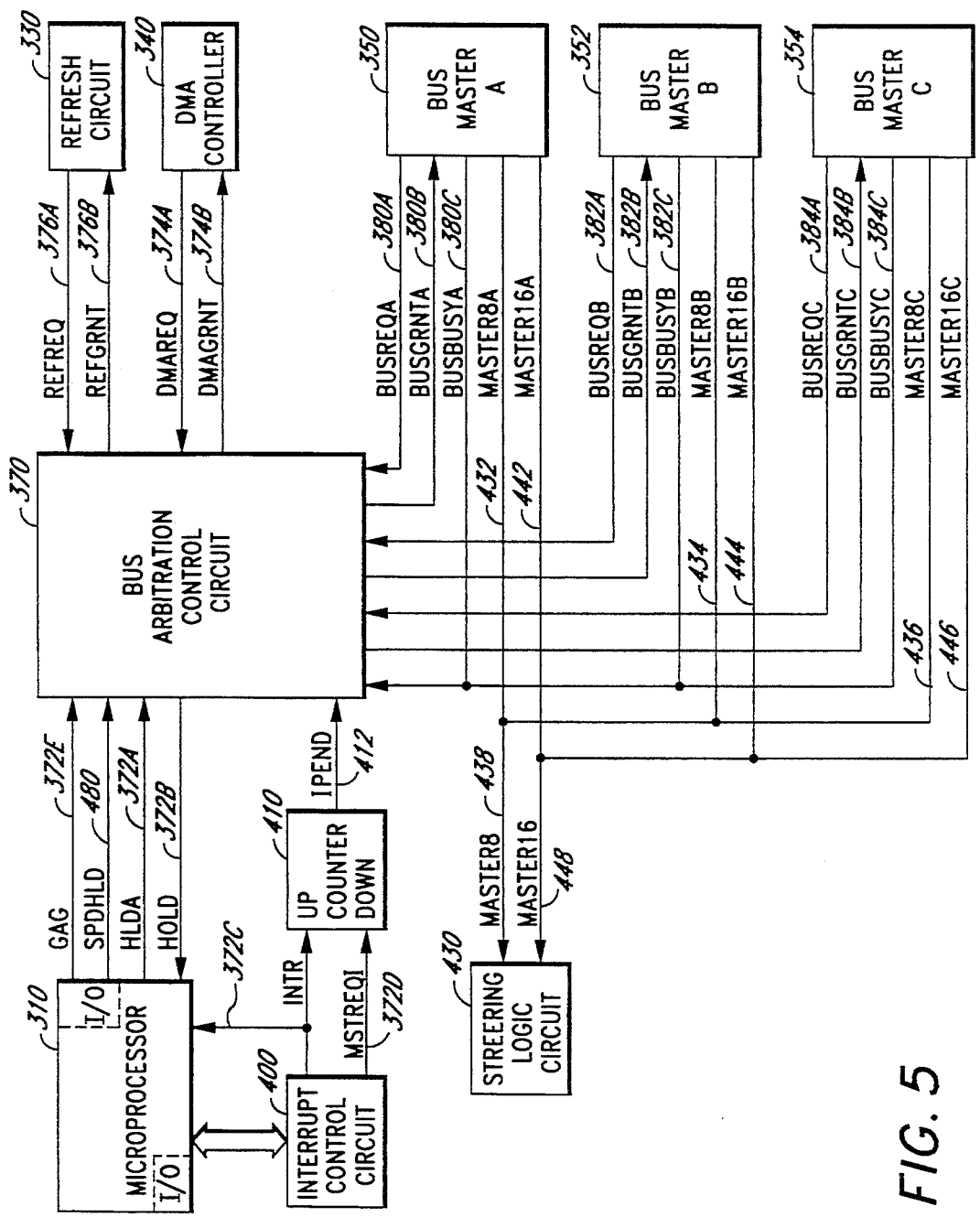
FIG. 5 is a block diagram of the control lines between the elements of the computer system of FIG. 4 and the bus arbitration control circuit.

FIG. 5 further illustrates the interconnection of the bus arbitration circuit 370 with the microprocessor 310, the system DMA controller 334, the system memory refresh circuit 334, and the bus masters 350, 352 and 354. As illustrated, the set of control lines 372 between the bus arbitration control circuit 370 and the microprocessor 310 comprises a hold request (HOLD) line 372A and a hold acknowledge (HLDA) line 372B. The HOLD line 372A communicates a signal from the bus arbitration control circuit 370 to the microprocessor 310 to request the microprocessor 310 to complete its current task and to relinquish control of the shared bus 318. When the microprocessor 310 has completed its current task (e.g., the current instruction in most cases), the microprocessor 310 will disable the tri-state outputs of the buffers associated with the microprocessor 310 and will activate a signal on the HLDA line 372B to indicate to the bus arbitration control circuit 370 that it can grant control of the shared bus 318 to one of the other users on the bus.

The set of control lines 372 between the bus arbitration control circuit 370 and the microprocessor 310 further includes an interrupt (INTR) line 372C and a master end of interrupt (MSTREOI) line 372D. The interrupt line 372C originates in an interrupt control circuit 400 (shown in dashed lines) that activates a signal on the interrupt line 372C when certain activities associated with the computer system 300 demand immediate attention by the microprocessor 310. For example, the microprocessor 310 is programmed to keep track of the time of day in response to a periodic interrupt signal from a timer circuit. Other interrupts can originate from peripheral devices, such as the floppy disk controller 334. In the present invention, the interrupt line 372C is also provided as an input to the bus arbitration control circuit 370 so that the bus arbitration control circuit 370 is able to monitor the interrupt activity of the microprocessor 310.

In an exemplary AT-type computer system 300, the interrupt control circuit 400 includes two cascaded programmable interrupt controllers (not shown) such as the Intel 8259A programmable interrupt controller, one of which is the master interrupt controller. In known AT-type computer systems utilizing the Intel 8259A programmable interrupt controllers, and the like, the master programmable interrupt controller is informed that the microprocessor 310 has completed the tasks responsive to an interrupt by outputting a particular code sequence to the master programmable interrupt controller. This code sequence, referred to as "master end of interrupt" (MSTREOI), is output on a particular I/O port associated with the programmable interrupt controller and is detected by the programmable interrupt controller to indicate that the microprocessor has completed the current interrupt task or is otherwise ready for the interrupts to be re-enabled by the programmable interrupt controller. For example, certain interrupt routines must be finished before additional interrupts may be allowed to occur. The routines associated with other lower priority interrupts can be interrupted. Thus, the MSTREOI code may be output by the microprocessor 310 even though it has not yet completed the processing of an interrupt routine. The operation of such a controller is well-known to the art.

The present invention includes additional simple logic circuitry within the interrupt control circuit 400 that monitors the port associated with the programmable interrupt controller and detects when the MSTREOI code (e.g., a hexadecimal code of 20) is output from the microprocessor 310. When the MSTREOI code is detected, the MSTREOI line 372D is activated to indicate that the microprocessor 310 has signaled the end of the interrupt routine. The bus arbitration control circuit 370 has an up/down counter 410 associated with it that receives the INTR signal line 372C and the MSTREOI signal line 372D. The up/down counter 410 is initially reset to a count state of zero to indicate that no interrupts have occurred. When an interrupt occurs, as indicated by an active signal on the INTR line 372C, the up/down counter 410 will be incremented to the next larger number (e.g., "1" for the first interrupt). When the MSTREOI signal line 372D is activated, the up/down counter 410 will be decremented. The up/down counter 410 provides an active output signal on an "interrupt pending" (IPEND) signal line 412 so long as the up/down counter 410 has a count other than zero. It can be seen that the up/down counter 410 will provide an active output signal on the IPEND signal line 412 so long as an interrupt has occurred that has not yet been serviced by the microprocessor 310, as indicated by the activation of the MSTREOI signal line 372D. Thus, the up/down counter 410 will keep track of nested interrupts (i.e., interrupts that occur and are recognized prior to the completion of the servicing of a previous interrupt). Proper programming practice requires that an MSTREOI code be provided as an output at sometime during the servicing of each interrupt. Thus, the MSTREOI signal line 372D should be activated once and only once for each interrupt that is serviced. In the event that additional MSTREOI codes are output, the up/down counter 410 is constrained to count down to zero and will not count below zero (i.e., into the negative binary range). As will be discussed more fully below, the interrupt pending (IPEND) signal line 412 is monitored by the bus arbitration control circuit 370 to determine whether the microprocessor 310 can be requested to relinquish control of the shared bus 318 to the DMA controller 334 or one of the bus masters 350, 352 or 354 by activating the HOLD line 372A.

The set of lines 372 between the microprocessor 310 and the bus arbitration control circuit 370 further includes an arbitration inhibit line shown as a GAG line 372E which is activated by the microprocessor 310 when it desires to disable the bus arbitration control circuit 370 from requesting access to the shared bus 318 on behalf of the three bus masters 350, 352, 354. In the preferred embodiment, the GAG line 372E is activated by the microprocessor 310 by performing an output operation on a predetermined I/O port with a predetermined bit set. For example, this is presently accomplished by setting bit 3 on I/O port address 61 (hexadecimal). Note that the I/O registers and associated address decoding logic are not explicitly shown in the drawing figures. Rather, microprocessor block 310 should be considered as including the various I/O ports discussed herein.

Figure 6:
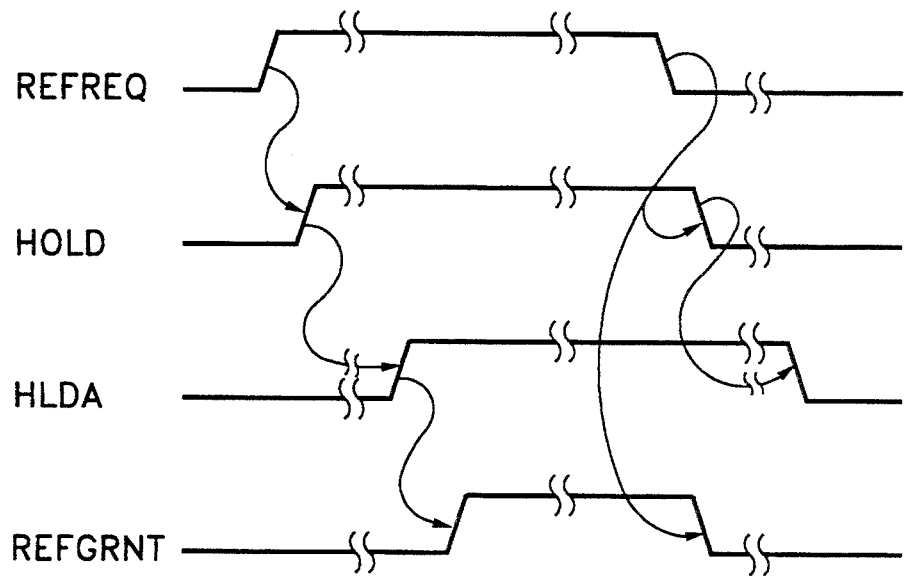
FIG. 6 is a timing diagram illustrating a refresh cycle interleaved with the microprocessor control of the shared system bus.

As further illustrated in FIG. 5, the set of lines 376 interconnecting the system memory refresh circuit 330 with the bus arbitration control circuit 370 includes a refresh request (REFREQ) line 376A from the system memory refresh circuit 330 to the bus arbitration control circuit 370 and a refresh grant (REFGRNT) line 376B from the bus arbitration control circuit 370 to the system memory refresh circuit 330. As illustrated by the timing diagram in FIG. 6, the refresh request line 376A communicates a refresh request signal from the system memory refresh circuit 330 to the bus arbitration control circuit 370. The refresh request signal is activated by the system memory refresh circuit 330 when it is time to periodically refresh the system memory 314. (For convenience in describing the timing diagrams, all signals are shown as being active when they are in a high state in the timing diagrams. Some of the signals, such as the refresh request signal and the refresh grant signal, are active in their low state in the exemplary commercial embodiment.) The bus arbitration control circuit 370 is responsive to the active refresh request signal on the refresh request line 376A to activate the signal on the HOLD line 372A to the microprocessor 310 to request the microprocessor 310 to relinquish the shared bus 318. When the microprocessor 310 completes its current task and relinquishes the shared bus 318, the microprocessor 310 activates the HLDA line 372B to indicate to the bus arbitration control circuit 370 that the shared bus 318 is available. Thereafter, the bus arbitration control circuit 370 activates the signal on the refresh grant line 376B to indicate to the system memory refresh circuit 330 that the shared bus 318 is available to it to perform a memory refresh cycle in a conventional manner. After the memory refresh cycle is completed, the system memory refresh circuit 330 returns the REFREQ signal on the refresh request line 376A to its inactive state to indicate to the bus arbitration control circuit 370 that the shared bus 318 is available. The bus arbitration control circuit 370 responds to the deactivation of the signal on the refresh request line 376A by either deactivating the hold request signal on the HOLD line 372A to permit the microprocessor 310 to resume control of the shared bus 318 or by granting control of the shared bus 318 to one of the other users (e.g., the DMA controller 334 or one of the bus masters 350, 352, 354). In FIG. 6, the case where the control of the shared bus 318 to the microprocessor 310 by deactivating the hold request signal on the HOLD line 372A is illustrated. As will be set forth in more detail below, one of the particularly advantageous features of the present invention is that the control of the shared bus 318 does not have to return to the microprocessor 310 as in the known AT-type shared bus architecture.

Figure 7:
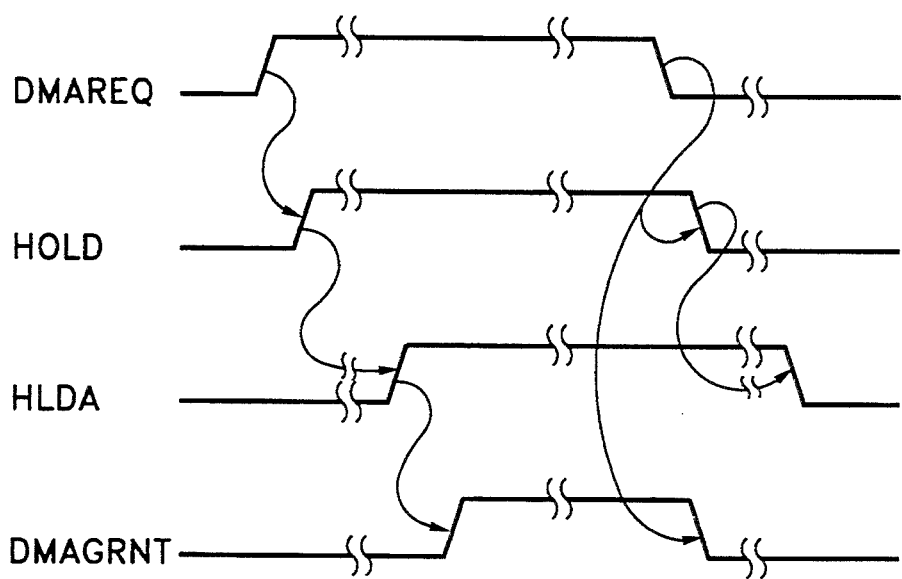
FIG. 7 is a timing diagram illustrating a DMA cycle interleaved with the microprocessor control of the shared system bus.

The set of lines 374 interconnecting the DMA controller 340 and the bus arbitration control circuit 370 includes a DMA request (DMAREQ) line 374A that communicates a DMA request signal from the DMA controller 340 to the bus arbitration control circuit 370 and a DMA grant (DMAGRNT) line 374B that communicates a DMA grant signal from the bus arbitration control circuit 370 to the DMA controller 340. The operation of the present invention in order to grant a DMA request is illustrated by the timing diagrams in FIG. 7. The DMA controller 340 activates the DMA request signal on the DMA request line 374A whenever it needs to gain control of the shared bus 318 to transfer data between the system memory 314 and the floppy disk controller 344. The bus arbitration control circuit 370 responds to the active DMA request signal and activates the HOLD signal on the HOLD line 372A to the microprocessor 310. When the microprocessor 310 relinquishes the shared bus 318 and activates the hold acknowledge signal on the HLDA line 372B, the bus arbitration control circuit 370 responds by activating the DMA grant signal on the DMA grant line 374B to indicate to the DMA controller 340 that it can grant control of the shared bus 318 to the floppy disk controller 344 or another device (not shown) that may be seeking control of the shared bus 318 via the DMA controller 340. The DMA operation then proceeds in a known conventional manner. When the floppy disk controller 344 or other device connected to the DMA controller 340 completes its DMA operation, typically after the transfer of a single data byte between the floppy disk drive 348 and the system memory 314, the DMA controller 340 deactivates the DMA request signal on the DMA request line 374A to indicate to the bus arbitration control circuit 370 that the DMA operation is completed. The bus arbitration control circuit 370 responds by deactivating the DMA grant signal on the DMA grant line 374B and by granting control of the shared bus 318 to one of the other users. In the event that no other requests for the shared bus 318 are pending, the control of the shared bus 318 is returned to the microprocessor 310 by deactivating the HOLD request signal on the HOLD line 372A, as illustrated in FIG. 7. Otherwise, the bus arbitration control circuit 370 generally grants control of the shared bus 318 to the user having the current highest priority, as will be discussed below.

Each set of lines between the bus masters and the bus arbitration control circuit 370 includes a bus request line, a bus grant line and a bus busy line. For example, the set of lines 380 between the BUS MASTER A 350 and the bus arbitration control circuit 370 includes a bus request (BUSREQA) line 380A that communicates a bus request signal from the BUS MASTER A 350 to the bus arbitration control circuit 370 to indicate that the BUS MASTER A 350 is requesting control of the shared bus 318; a bus grant (BUSGRNTA) line that communicates a bus grant signal from the bus arbitration control circuit 370 to the BUS MASTER A 350 to indicate that the BUS MASTER A 350 has been granted control of the shared bus 318; and a bus busy (BUSBUSYA) line 380C that is activated by the BUS MASTER A 350 to indicate that it is continuing to use the shared bus 318. The set of lines 382 communicates equivalent signals between the BUS MASTER B 352 and the bus arbitration control circuit 370, and comprises a bus request (BUSREQB) 382A, a bus grant (BUSGRNTB) line 382B and a bus busy (BUSBUSYB) line 382C. Similarly, the set of lines 384 communicates equivalent signals between the BUS MASTER C 354 and the bus arbitration control circuit 370, and comprises a bus request (BUSREQC) 384A, a bus grant (BUSGRNTC) line 384B and a bus busy (BUSBUSYC) line 384C. As illustrated, the BUSBUSYA line 380C, the BUSBUSYB line 382C and the BUSBUSYC line 384C are electrically connected together and provided as a combined bus busy input to the bus arbitration control circuit 370 on a BUSBUSY line 414. Preferably, the logic circuits driving the BUSBUSY lines 380C, 382C, 384C from the bus masters are known open-collector output logic circuits or other suitable circuits that lend themselves to being electrically connected together. For example, with open-collector output logic circuits, when any one of the bus masters activate the corresponding bus busy signal, the BUSBUSY lines 380C, 382C, 384C will be pulled low to indicate that the corresponding bus master is continuing to use the shared bus 318. (Again, it should be noted that the timing diagrams represent the logically active states of all signals as being high irrespective of the specific implementation of the signals in the exemplary physical system.)

When one of the bus masters needs to have access to the shared bus 318 to transfer data between its associated peripheral device and the system memory 314, the bus master activates the bus request signal on its respective bus request line 380A, 382A, 384A. The bus arbitration control circuit 370 responds to an active bus request signal by activating the hold request signal on the HOLD line 372A and waiting for the microprocessor 310 to activate the hold acknowledge signal on the HLDA line 372B to indicate that the shared bus 318 is available. Then, assuming that neither the refresh request signal on the refresh request line 376A or the DMA request signal on the DMA request line 374A is active, the bus arbitration control circuit 370 grants control of the shared bus 318 to the requesting bus master having the current highest request priority by activating the respective bus grant signal on the corresponding bus grant line. Thereafter, the bus master to which control of the shared bus 318 is granted assumes control of the share bus 318 and activates its respective bus busy signal to indicate that it is using the shared bus 318.

Figure 8:
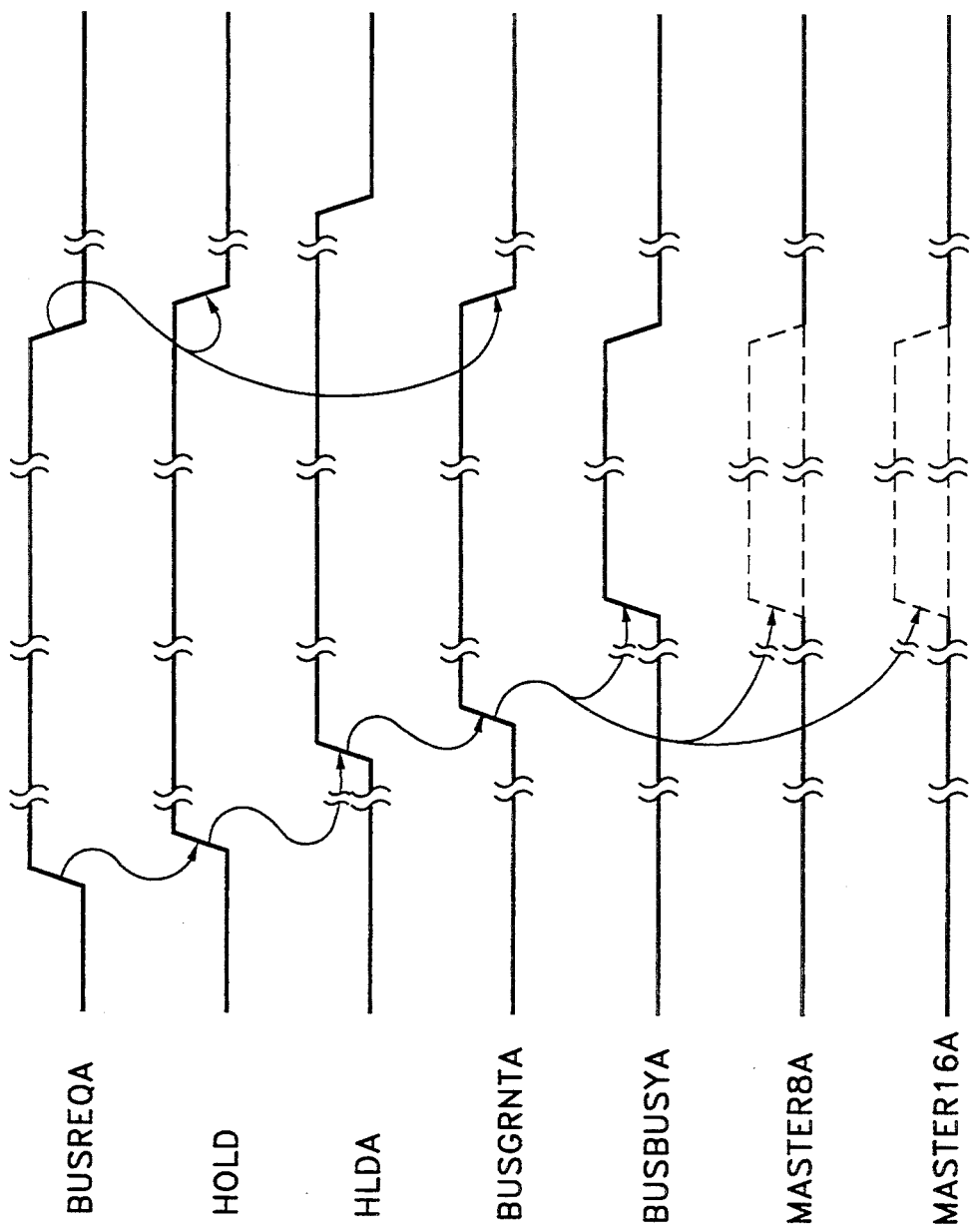
FIG. 8 is a timing diagram illustrating the transfer of control of the shared system bus to a bus master in accordance with the present invention.

An exemplary timing diagram for the present invention in responding to a request from the BUS MASTER A 350 is illustrated in FIG. 8. As illustrated, the BUS MASTER A 350 requests control of the shared bus 318 by activating the BUSREQA signal on the BUSREQA line 380A. The bus arbitration control circuit 370 responds by activating the hold request signal on the HOLD line 372A and waiting for the microprocessor 310 to activate the hold acknowledge signal on the HLDA line 372B. Thereafter, the bus arbitration control circuit 370 activates the BUSGRNTA signal on the BUSGRNTA line 380B to indicate to the BUS MASTER A 350 that it has control of the shared bus 318. The BUS MASTER A 350 responds by activating the BUSBUSYA signal on the BUSBUSYA line 380C to indicate to the bus arbitration control circuit 370 that it has accepted control of the shared bus 318 and that the shared bus 318 is in use. As illustrated in FIG. 8, the BUS MASTER A 350 will maintain the BUSREQA signal and the BUSBUSYA signal in their respective active states until the BUS MASTER A 350 has completed all bus transfers between the system memory 314 and the device connected to the BUS MASTER A 350 (e.g., the hard disk drive 360). Thereafter, the BUS MASTER A 350 deactivates the BUSREQA signal on the BUSREQA line 380A. The bus arbitration control circuit 370 responds to the deactivation of the BUSREQA signal by deactivating the BUSGRNTA signal on the BUSGRNTA line 380B. The BUS MASTER A 350 then deactivates the BUSBUSYA signal on the BUSBUSYA line 380C to indicate that it has relinquished control of the shared bus 318. Thereafter, assuming that no other bus requests are pending, the bus arbitration control circuit 370 deactivates the hold request signal on the HOLD line 372A to inform the microprocessor 310 that it can resume control of the shared bus 318. The microprocessor 310 deactivates the hold acknowledge signal on the HLDA line 372B to indicate that it has resumed control of the shared bus 318. Unlike the previously described DMA controller 340 which typically is programmed to transfer only a single byte of data each time it obtains control of the shared bus 318, the BUS MASTER A 350 preferably retains control of the shared bus to transfer multiple bytes of data between its associated peripheral device (e.g., the hard disk drive 360) and the system memory 314. As will be discussed in more detail below, even if a higher priority device (e.g, the system memory refresh circuit 330) is granted control of the shared bus 318 before the BUS MASTER A 350 has completed its transfers, the control of the shared bus 318 is returned to the BUS MASTER A 350 so that it may generally complete its transfers.

Continuing with FIGS. 5 and 8, each of the three bus masters is connected to a steering logic circuit 430 that directs the data from the devices connected to the bus masters onto the shared bus 318. As is known to one skilled in the art, the AT-type bus architecture accommodates both eight-bit transfers and sixteen-bit transfers. A bus master can be connected to a device that transfers data either eight bits at a time or to a device that transfers data sixteen bits at a time or to a device that may transfer in either mode. In order to accommodate the different types of transfers, each of the bus masters includes a pair of output signals that identifies whether the bus master is an eight-bit master or a sixteen-bit master. The first output signal is a MASTER8 signal which identifies the bus master as being only capable of transferring data to and from the shared bus 318 eight bits at a time. Thus, the BUS MASTER A 350 provides a MASTER8A signal on a MASTER8A line 432, the BUS MASTER B 352 provides a MASTER8B signal on a MASTER8B line 434, and the BUS MASTER C 354 provides a MASTER8C signal on a MASTER8C line 436. Preferably, the logic circuit in each bus master that drives the MASTER8 signal line is an open-collector logic circuit, three MASTER8 lines are electrically connected together and provided to the steering logic circuit 430 as a single MASTER8 signal line 438. Only the bus master to which the control of the shared bus 318 has been granted will activate its respective MASTER8 signal line. The activation will occur at the same time as the bus master activates the BUSBUSY signal line, as illustrated in FIG. 8 for the MASTER8A signal line 432.

The second output signal provided by each bus master is a MASTER16 signal line. As illustrated in FIG. 5, the BUS MASTER A 350 provides a MASTER16A signal on a MASTER16A line 442; the BUS MASTER B 352 provides a MASRTER16B signal on a MASTER16B line 444; and the BUS MASTER C 354 provides a MASTER16C signal on a MASTER16C line 446. The three MASTER16 signals are preferably driven by open-collector logic circuits, or the like, and the corresponding MASTER16 lines are electrically connected together to provide a single MASTER16 signal line 448 that is provided as an input to the steering logic circuit 430. The respective MASTER16 signal is activated at the same time as the BUSBUSY signal by a bus master to indicate that the bus master is capable of both eight-bit transfers and sixteen-bit transfers.

When a bus master is granted control of the shared bus 318, the bus master activates the BUSBUSY signal on the BUSBUSY line 414, as discussed above. At substantially the same time that it activates the BUSBUSY signal, the bus master also activates the appropriate MASTER8 or MASTER16 control signal on the line 438 or 448, respectively. It should be understood that the MASTER8 and MASTER16 signals are mutually exclusive. In the initial phase of a bus master data transfer cycle on the shared data bus, shortly after the master has asserted address information, the slave device being accessed may assert the IOCS16 signal or the MEMCS16 signal to indicate that it has a sixteen bit wide data path. Those skilled in the art will recognize the IOCS16 and MEMCS16 signals as the conventional AT-type bus signals for sixteen-bit I/O devices and sixteen-bit memory devices, respectively. During bus master data transfer cycles the data bus steering logic circuit 430 examines the MASTER8 and MASTER16 signals to determine the data bus width of the active master. The steering logic circuit 430 also examines the logic state of the IOCS16 and MEMCS16 signals to determine the data bus width of the slave device being accessed. With this information, the steering logic circuit 430 determines whether or not the data bus width of the active bus master matches the data bus width of the addressed slave device. If the bus master and the slave device data paths are of equal width, the steering logic circuit 430 becomes passive and does not have any effect on the data transfer cycle being performed. In the case where bus master and slave device data paths are of different widths, the steering logic circuit 430 will translate the least significant byte of the shared data bus 318 to or from the most significant byte of the shared data bus 318 in response to the state of the conventional address line SA0 and the conventional signal SBHE, as set forth in the following paragraphs.

When an eight-bit bus master performs a read cycle to a sixteen-bit slave device, such as the system memory 314, the steering logic circuit 430 will cause the most significant byte of the shared data bus 318 to be transferred to the least significant byte of the shared data bus 318 when the address line SA0 is active. When an eight-bit master performs a write cycle to a sixteen-bit slave device the steering logic circuit 430 will cause the least significant byte of the shared data bus 318 to be transferred to the most significant byte of the shared data bus 318 when the address line SA0 is active.

When a sixteen-bit master performs a read cycle to an eight-bit slave device, the steering logic circuit 430 will cause the least significant byte of the shared data bus 318 to be transferred to the most significant byte of the shared data bus 318 when the SBHE signal is active. When a sixteen-bit master performs a write cycle to an eight-bit slave device, the steering logic circuit 430 will cause the most significant byte of the shared data bus 318 to be transferred to the least significant byte of the shared data bus 318 when the SBHE signal is active.

The foregoing descriptions of the various operations of bus arbitration control circuit 370 assumed that the microprocessor 310 initially had control of the shared bus 318 and relinquishes the shared bus 318 to a single requesting device (i.e., the system memory refresh circuit 330, the DMA controller 340 or one of the bus masters 350, 352 or 354). One of the significant advantages of the bus arbitration control circuit 370 of the present invention is that it permits transfers of multiple bytes of data between the system memory 314 and a peripheral device connected to a bus master without interruption by the microprocessor 310, thereby reducing the time overhead in arbitrating control of the shared bus 318 and switching control of the shared bus 318 between the multiple users. The bus arbitration control circuit 370 is able to provide this improved operation without sacrificing the protection provided by the conventional AT-type DMA controller that only transfers one byte each time it is granted control of the shared bus.

Figure 9:
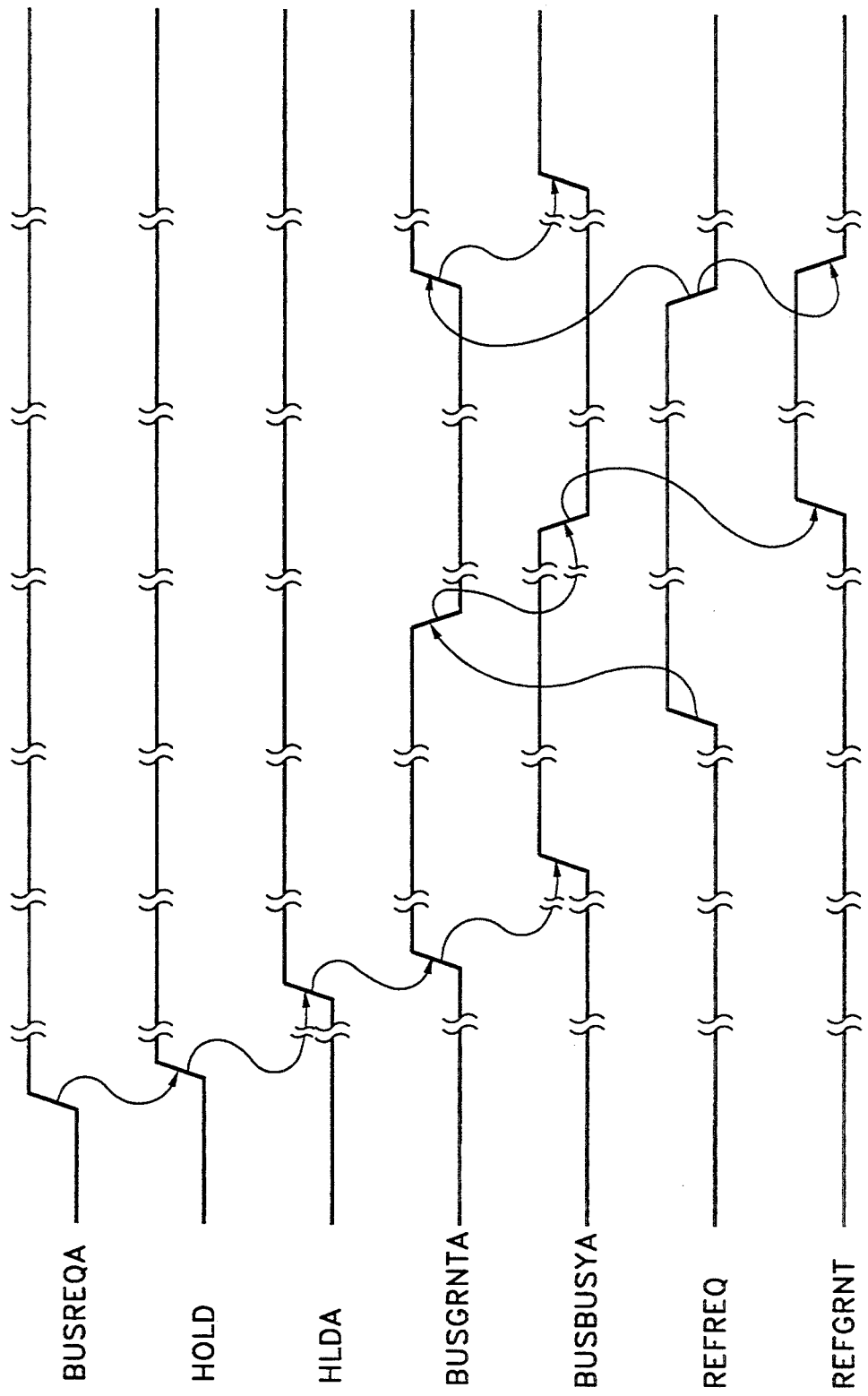
FIG. 9 is a timing diagram illustrating a bus master cycle temporarily interrupted by a memory refresh cycle.
Figure 10:
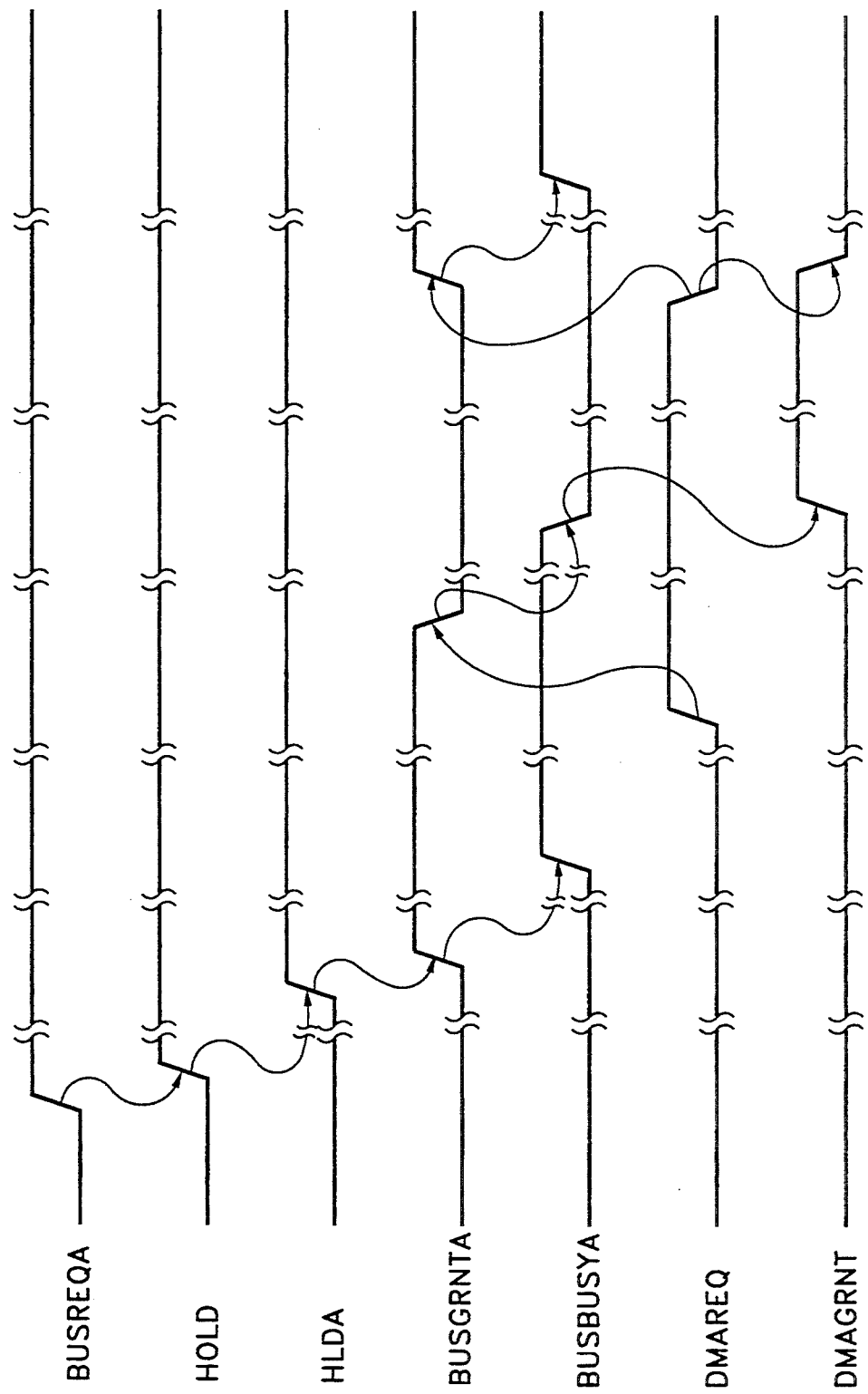
FIG. 10 is a timing diagram illustrating a bus master cycle temporarily interrupted by a DMA cycle.

The first protection provided by the bus arbitration control circuit 370 is that the system memory refresh circuit 330 and the DMA controller 340 are given higher priority access to the shared bus 318. Thus, if a refresh request or a DMA request occurs while one of the bus masters is controlling the shared bus 318, the bus arbitration control circuit 370 responds by deactivating the current bus grant signal and granting access to the device or devices having a higher priority request. This feature is illustrated in FIGS. 9 and 10. In FIG. 9, the BUS MASTER A 350 is granted control of the shared bus 318, as previously described. However, prior to the completion of all the transfers by the BUS MASTER A 350, a refresh request (REFREQ) signal is activated by the system memory refresh circuit 330 to indicate that it must refresh the system memory 314. The bus arbitration control circuit 370 responds to the refresh request by deactivating the BUSGRNTA signal to the BUS MASTER A 350 and waiting for the BUS MASTER A 350 to complete its current transfer cycle and deactivate the BUSBUSYA signal to indicate that it has disabled its line drivers from the shared bus 318. Thereafter, the bus arbitration control circuit 370 activates the refresh grant (REFGRNT) signal on the line 376B to the system memory refresh circuit 330 which then performs a refresh cycle, as discussed above. During the refresh cycle, the BUS MASTER A 350 retains an active signal on the BUSREQA line 380A to indicate that it was not finished with its transfers and that the control of the shared bus 318 should be returned to it when the refresh cycle is completed. It can be seen in FIG. 9 that when the system memory refresh circuit 330 completes the refresh cycle, the REFREQ signal is deactivated. The bus arbitration control circuit 370 responds to the deactivation of the REFREQ signal by deactivating the REFGRNT signal and activating the BUSGRNTA signal to inform the BUS MASTER A 350 that it again has control of the shared bus 318. The control of the shared bus 318 is granted to the BUS MASTER A 350 irrespective of pending bus requests from the other two bus masters. Thus, there is no need for the bus arbitration control circuit 370 to arbitrate the priority of bus requests from more than one bus master when it returns control of the shared bus 318 to the bus master that had control of the bus prior to the interruption. When the BUSGRNTA signal is activated, the BUS MASTER A 350 activates the BUSBUSYA signal and resumes its data transfers, as before. When the BUS MASTER A 350 has completed all its transfers, it deactivates the BUSREQA and BUSBUSYA signals in the order described above. Although not shown in FIG. 9 and the following figures, it should be understood that the appropriate MASTER8A signal or MASTER16A signal is activated and deactivated at substantially the same time as the BUSBUSYA signal, as discussed above. In like manner, it should be understood that the corresponding MASTER8 or MASTER16 signals are activated at substantially the same time as the BUSBUSY signals for the other two bus masters.

FIG. 10 is a timing diagram that illustrates the interruption of a bus master cycle by a DMA cycle. FIG. 10 is similar to FIG. 9 but for the substitution of the DMA request and DMA grant signals for the corresponding refresh request and refresh grant signals.

Figure 11:
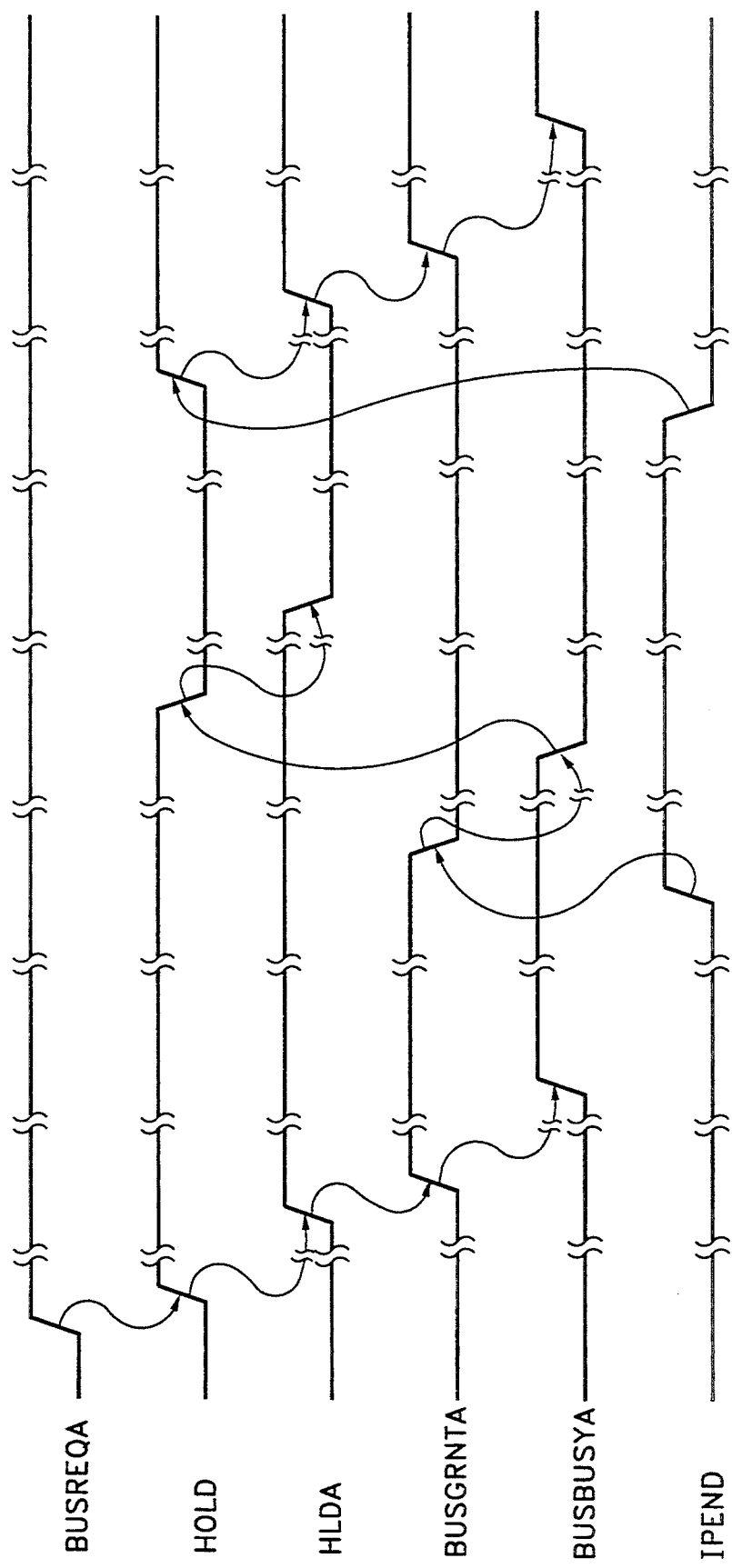
FIG. 11 is a timing diagram illustrating the transfer of the control of the shared bus to the microprocessor in response to a pending interrupt.

By interrupting the transfers of data by a bus master to permit the higher priority refresh cycles and DMA transfers, as discussed above, the bus arbitration control circuit 370 provides protection of the system integrity while permitting burst transfers of data by the bus masters by assuring that these time critical operations occur on the shared bus 318 with little delay. The bus arbitration control circuit 370 provides additional protection of the system integrity by assuring that the microprocessor 310 is able to handle interrupts on a timely basis. For example, in order for the microprocessor 310 to properly respond to real-time interrupts, such as the timer interrupt, it is necessary that the microprocessor 310 be able to execute the instructions associated with the real-time interrupt shortly after the interrupt occurs. Thus, the bus arbitration control circuit 370 monitors the activity of the interrupts to the microprocessor 310 and grants control of the shared bus 318 to the microprocessor 310 so that the microprocessor 310 is able to respond to the interrupts on a timely basis. This feature of the bus arbitration control circuit 370 is illustrated by the timing diagrams in FIG. 11. As illustrated, the BUS MASTER A 350 is granted control of the shared bus 318 by the activation of the BUSGRNTA signal in response to an active BUSREQA signal. The BUS MASTER A 350 activates the BUSBUSYA signal to indicate that it is actively using the shared bus 318. When the microprocessor 310 receives an interrupt, the interrupt pending (IPEND) signal on the IPEND signal line 412 from the up/down counter 410 becomes active to indicate that an interrupt has been received and that the microprocessor 310 has not completed the processing of the interrupt. The bus arbitration control circuit 370 responds to the active interrupt pending signal by deactivating the BUSGRNTA signal to the BUS MASTER A 350. When the BUS MASTER A 350 has completed the current operation on the shared bus 318, it deactivates the BUSBUSYA signal to indicate that it has disabled its bus drivers. However, the BUS MASTER A 350 maintains the BUSREQA signal in its active state to indicate that it wants control of the shared bus 318 returned to it when the interrupt has been processed. When the bus arbitration control circuit 370 detects that the combined BUSBUSY signal has been deactivated, the bus arbitration control circuit 370 deactivates the hold request signal to the microprocessor 310. The microprocessor 310 deactivates the hold acknowledge signal to indicate that it has regained control of the shared bus 318 and begins processing instructions. As set forth above, when the microprocessor 310 completes the interrupt processing, it outputs an MSTREOI code to the interrupt circuitry to indicate that it is ready to accept any further interrupts that may be pending. As discussed above, the interrupt control circuit 400 monitors the port associated with the interrupt circuitry and detects when the MSTREOI signal occurs to cause the up/down counter 410 to decrement by one. If no additional interrupts have been received and the up/down counter 410 is decremented to zero, then the interrupt pending (IPEND) signal is deactivated by the up/down counter 410. Thereafter, the bus arbitration control circuit 370 activates the hold request signal on the HOLD line 372A to gain control of the shared bus 318. When the microprocessor 310 activates the hold acknowledge signal on the HLDA line 372B, the bus arbitration control circuit 370 then arbitrates the pending bus request from the bus masters 350, 352, 354. If the BUS MASTER A 350 has the currently highest priority request, the bus arbitration control circuit 370 re-activates the BUSGRNTA signal to the BUS MASTER A 350 to permit the BUS MASTER A 350 to resume its data transfers, as shown. On the other hand, if another bus master has a higher priority request, the bus arbitration control circuit 370 will grant control of the shared bus 318 to the master having the highest priority. It should be noted that this differs from the refresh requests and the DMA requests wherein the control of the shared bus 318 is returned to the bus master having control of the shared bus 318 prior to the refresh request or the DMA request. In an alternative embodiment, the bus arbitration control circuit 370 returns control of the shared bus to the bus master that was interrupted by the interrupt as it does after the refresh request and DMA request.

As set forth above, if additional interrupts occur before the processing of the initial interrupt is completed, the up/down counter 410 will maintain the interrupt pending signal in its active state until the number of active MSTREOI signals output by the microprocessor 310 is equal to the number of interrupts. It should be understood that during the processing of interrupts, the bus arbitration control circuit 370 continues to honor the refresh requests from the system memory refresh circuit 330 to assure that the system memory 314 is properly refreshed. Thus, it can be seen that the bus arbitration control circuit 370 of the present invention permits the bus masters to provide burst transfers of data on the shared bus 318 while maintaining the integrity of the real-time interrupt processing operations of the microprocessor 310.

Figure 12:
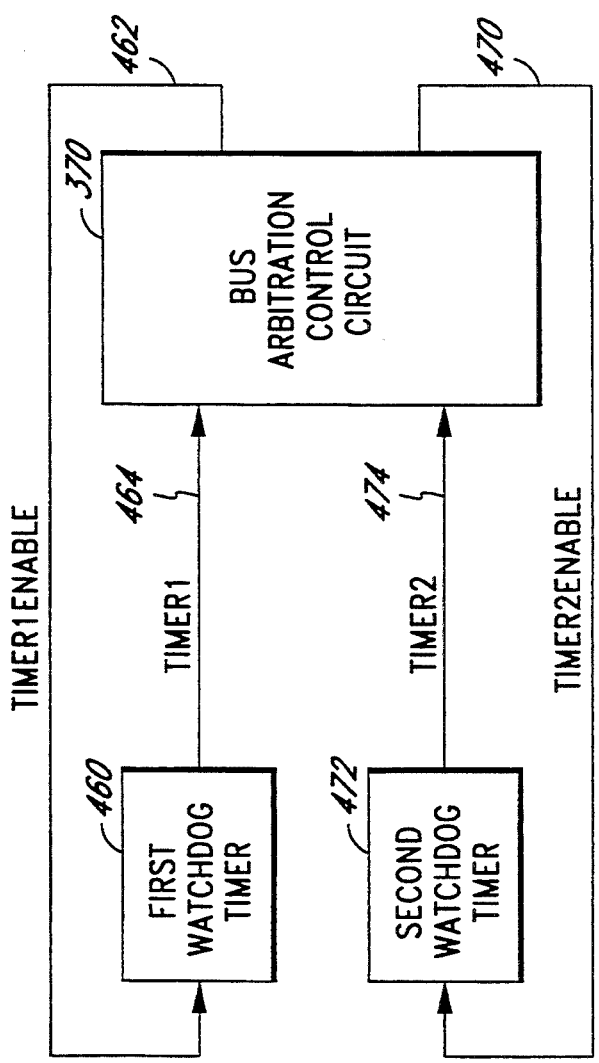
FIG. 12 is a block diagram illustrating the interconnection of the two watchdog timer circuits to the bus arbitration control circuit.

The bus arbitration control circuit 370 provides additional protection for the integrity of the computer system 300. It can be seen that for large bursts of data by one of the bus masters, the microprocessor 310 is effectively unable to process instructions other than those associated with responding to interrupts. Thus, it may be possible for a bus master to gain control of the shared bus 318 and effectively prevent the microprocessor 310 from monitoring the bus activity or to perform any other function other that the absolute necessities of processing the real-time interrupts. Furthermore, the other two bus masters would be effectively precluded from gaining access to the shared bus 318 during this time. Although good programming practice and system design practice would dictate that the bus masters be programmed or wired to limit the length of burst transfers, there are no assurances that designers of bus masters will follow good programming and design practices or that a bus master will not have a hardware or software fault that allows very long bus transfers. Thus, the bus arbitration control circuit 370 includes a first watchdog timer circuit 460 associated with it that is initialized whenever the bus arbitration control circuit 370 grants control of the shared bus 318 to one of the bus masters. This feature of the bus arbitration control circuit 370 of the present invention is illustrated schematically in FIG. 12 and by timing diagrams in FIGS. 13 and 14. A first timer enable signal is provided on a first timer enable (TIMER1ENABLE) line 462 from the bus arbitration control circuit 370 to the first watchdog timer circuit 460. The first timer enable signal is activated by the bus arbitration control circuit 370 when the bus is initially granted to one of the three bus masters, as indicated by the activation of the BUSGRNTA signal, for example. The first watchdog timer circuit 460 provides an active first timer output signal on a TIMER1 line 464 from the first watchdog timer circuit 460 to an input of the bus arbitration control circuit 370. The first timer output signal on the TIMER1 line 464 remains active until the expiration of a predetermined time after the first timer enable signal is activated, as illustrated in FIG. 13, or until the first timer enable signal on the TIMER1ENABLE line 462 is deactivated by the bus arbitration control circuit 370, as illustrated in FIG. 14.

The predetermined time that the first timer output signal is active is selected to be sufficiently long to allow a bus master to complete a burst data transfer of a reasonable length, yet sufficiently short that bus arbitration control circuit 370 will regain control of the shared bus 318 so that it may grant control of the shared bus 318 to the microprocessor 310 after a reasonable length of time so that, for example, the microprocessor 310 may use the shared bus 318 to perform non-interrupt instructions. For example, in one application, the predetermined time that the first timer output signal is active is programmed to be approximately the amount of time required to transfer 512 bytes of data, allowing time for the anticipated delay caused by the interposed refresh operations. The first watchdog timer circuit 460 is programmable so that the predetermined time can be varied in accordance with the type of applications that the computer system 300 is intended or in accordance with the type of peripheral devices to be serviced by the bus masters.

Figure 13:
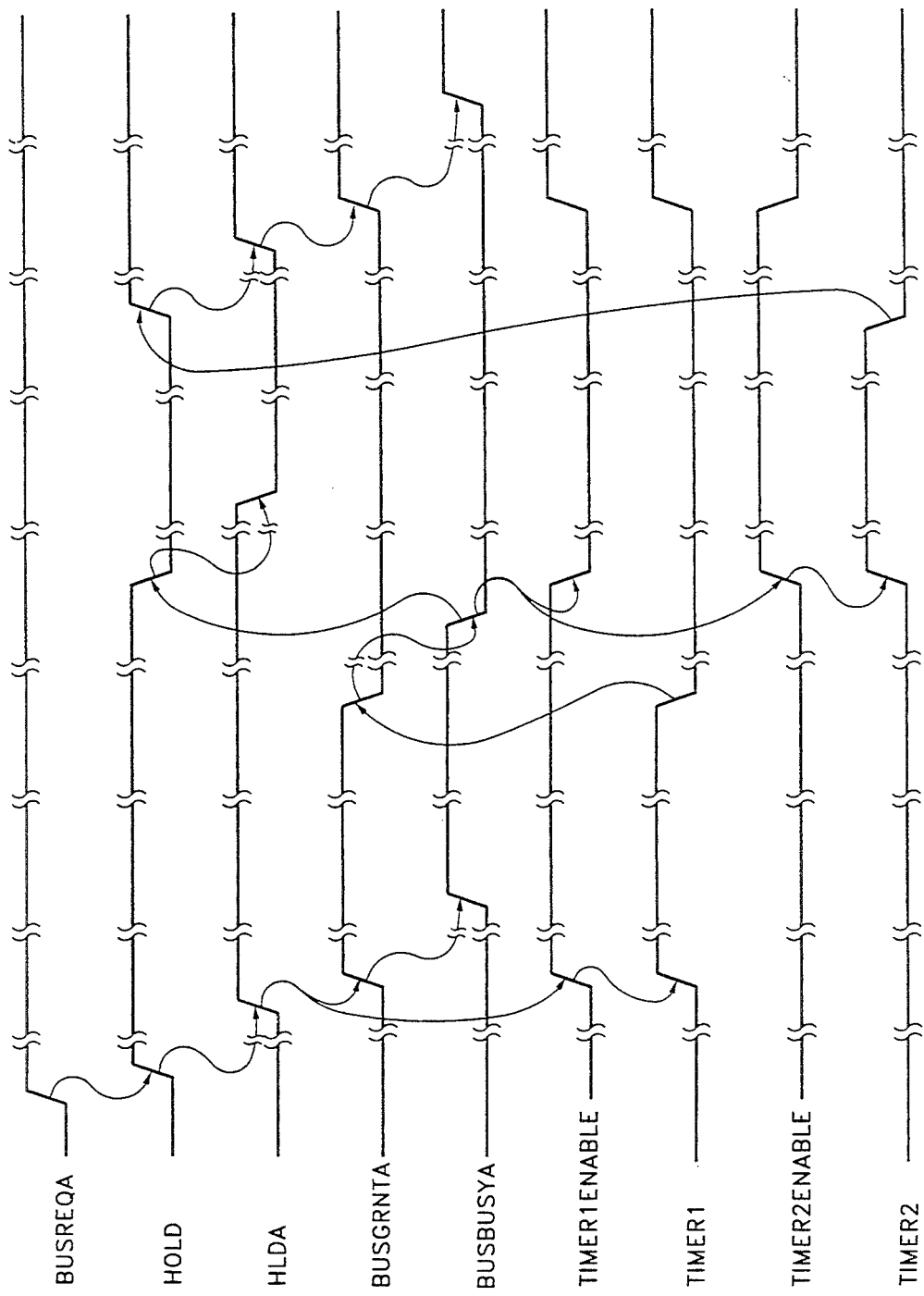
FIG. 13 is a timing diagram illustrating the operation of the first and second watchdog timers to prevent a bus master from retaining control of the shared bus for an extended amount of time.

When the first timer output signal becomes inactive at the expiration of the first predetermined time, as illustrated in FIG. 13, the bus arbitration control circuit 370 deactivates the bus grant signal to the currently active bus master. Thereafter, the bus arbitration control circuit 370 waits for the deactivation of the combined BUSBUSY signal and then deactivates the hold request signal on the HOLD line 372A so that the microprocessor 310 can gain control of the shared bus 318. At the same time, the bus arbitration control circuit 370 deactivates the first timer enable signal so that the first watchdog timer 460 is reset to a condition where it can respond to the next activation of the first timer enable signal.

Figure 14:
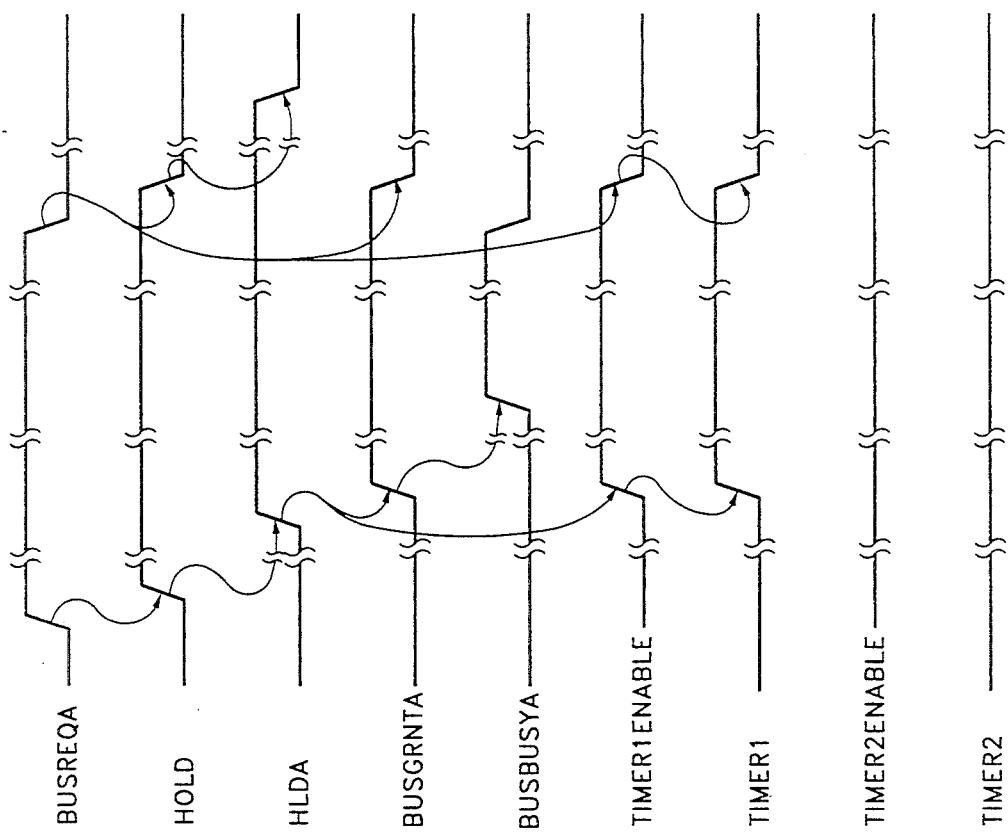
FIG. 14 is a timing diagram illustrating the disabling of the first watchdog timer when the bus master completes its data transfers on the shared bus.

As illustrated in FIG. 14, when a bus master (e.g., the BUS MASTER A 350) completes its data transfers on the shared bus 318 and deactivates its bus request and bus busy signals, if there are no further bus requests pending from another bus master, the bus arbitration control circuit 370 deactivates the hold request signal to the microprocessor 310 so that the microprocessor 310 can resume control of the shared bus. When this condition occurs, the bus arbitration control circuit 370 also deactivates the first timer enable signal on the TIMER1ENABLE line 462 to reset the first watchdog timer 460 so that it is in a condition to be re-enabled when the next request from a bus master is honored.

Returning to FIG. 13, when the first timer output signal becomes inactive at the expiration of the first predetermined amount of time, the bus arbitration control circuit 370 activates a second timer enable signal on a TIMER2ENABLE signal line 470 that interconnects the bus arbitration control circuit 370 and a second programmable watchdog timer circuit 472. The second programmable watchdog timer circuit 472 is responsive to the second timer enable signal and provides a second timer output signal on a TIMER2 signal line 474 to indicate that the second programmable watchdog timer circuit 472 is active.

During the time that the second timer output signal is active on the TIMER2 line 474, the bus arbitration control circuit 370 does not honor bus requests from the bus masters. This permits the microprocessor 310 to have sufficient time to perform any routine instructions that it has not been able to perform while one or more of the bus masters were performing burst transfers of data on the shared bus 318. The bus arbitration control circuit 370 will continue to honor refresh requests and DMA requests, as before, although such requests are not illustrated in FIG. 13.

When the second predetermined time has expired, the bus arbitration control circuit 370 deactivates the second timer enable signal on the TIMER2ENABLE line 470 to reset the second watchdog timer 472 so that it is in a condition to be enabled at the next expiration of the first predetermined time provided by the first watchdog timer 460. Thereafter, the bus arbitration control circuit 370 begins arbitrating active bus requests from the bus masters 350, 352, 354. In the event that the microprocessor 310 needs additional time in which to perform non-interrupt processing tasks, the microprocessor can activate the signal on the GAG line 372E, as discussed above. When the bus arbitration control circuit 370 resumes arbitration of bus requests from the bus masters 350, 352 and 354, it does not necessarily grant the control of the shared bus 318 back to the bus master that was controlling the bus prior to the expiration of the first timer signal on the TIMER1 signal line 462 unless that bus master has the only currently active bus request. Rather, in the event that more than one bus master is requesting access to the shared bus 318, the bus arbitration control circuit 370 will grant control of the shared bus 318 to the bus master having the highest priority. In the preferred embodiment of the present invention, the bus arbitration control circuit 370 assigns the priorities to the three bus masters on a rotating basis. In particular, when a bus master is granted access to the shared bus 318, that bus master is automatically assigned to the lowest priority. Thereafter, when that bus master relinquishes the bus, either as a result of the lapse of the predetermined time associated with the first watchdog timer circuit 460 or by completing a burst transfer and deactivating its bus request signal, it will not regain control of the shared bus 318 when the bus arbitration control circuit 370 next arbitrates the pending bus requests unless it has the only active bus request. Instead, one of the other bus masters will be granted control of the shared bus 318 ahead of it. Of course, when the next bus master relinquishes the shared bus 318 by completing its transfers or as a result of a timeout of the first watchdog timer circuit 460, the original bus master will be replaced at the bottom of the priority scheme by the next bus master. The combination of the first watchdog timer circuit 460 and the rotating priority assures that one bus master cannot preclude the other bus masters from using the shared bus 318 by maintaining a constant bus request signal. In FIG. 13, it is assumed that no other bus master is requesting access to the shared bus 318, and the control of the shared bus 318 is illustrated as being granted back to the BUS MASTER A 350.

In alternative embodiments of the present invention, the priority of access to the shared bus 318 by the three bus masters can be fixed. For example, the BUS MASTER A 350 could advantageously have the highest priority, followed by the BUS MASTER B 352, with the BUS MASTER C 354 having the lowest priority.

The bus arbitration control circuit 370 includes one additional input signal from the microprocessor 310 via a SPDHLD line 480 from a programmable output port associated with the microprocessor 310. This input signal is referred to as a speed hold signal and is activated to effectively slow the instruction processing rate of the microprocessor 310 to thereby support time-dependent software that was originally developed to operate on slower microprocessors. When the microprocessor 310 activates the speed hold signal on the SPDHLD line 480, the bus arbitration control circuit 370 periodically activates the hold request signal on the HOLD line 372A to cause the microprocessor 310 to relinquish control of the shared bus 318. The bus arbitration control circuit 370 does not grant control of the shared bus 318 to another device. Rather, the bus arbitration control circuit 370 deactivates the hold request signal after a predetermined time to allow the microprocessor 310 to resume processing. This has the effect of reducing the apparent overall speed of the microprocessor 310 so that the time-dependent software operates properly.

Figure 15:
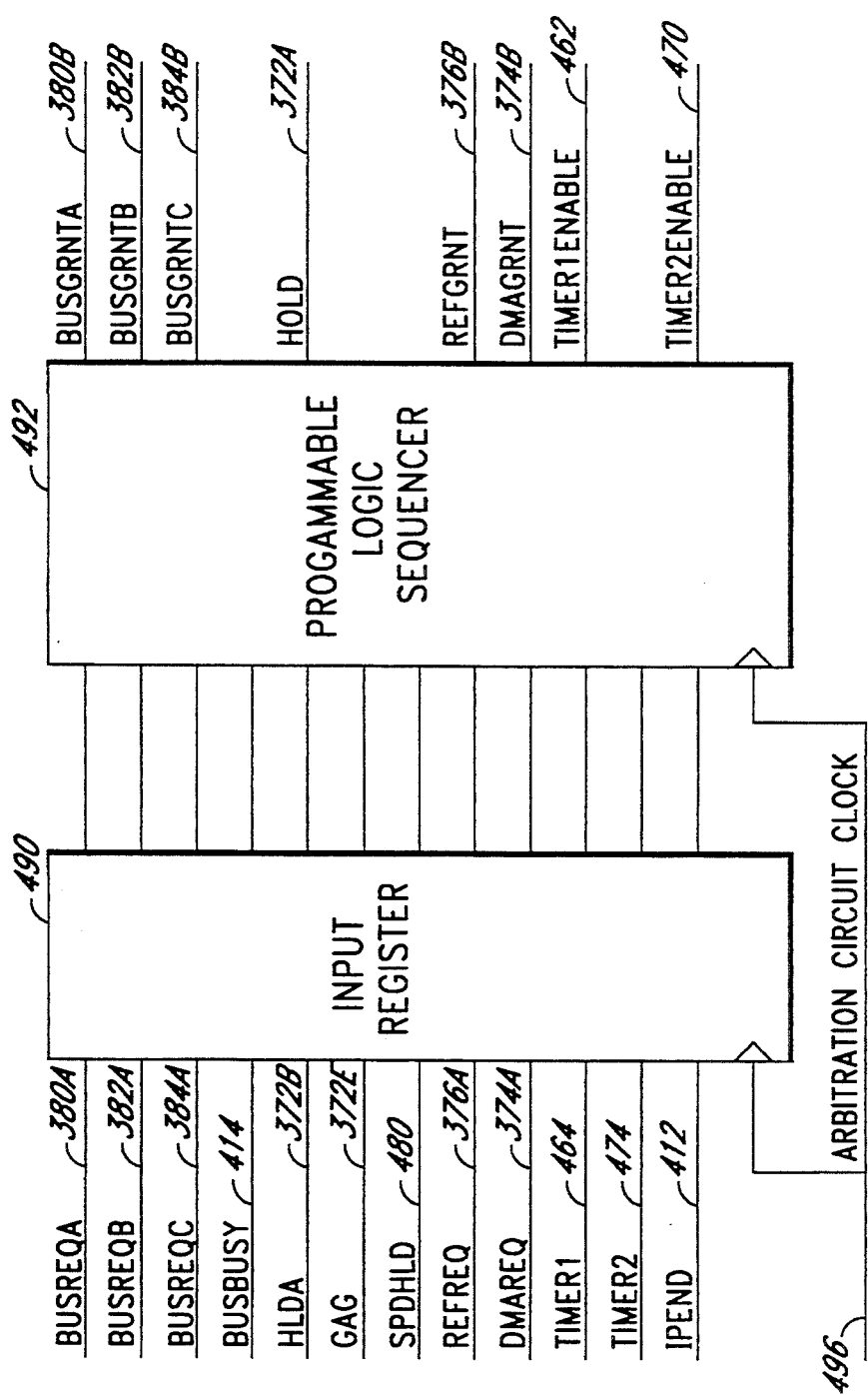
FIG. 15 is a block diagram of the bus arbitration control circuit 370 showing the input register and the programmable logic sequencer.

In the preferred embodiment of the present invention, the bus arbitration control circuit 370 is a state machine in which the next state and the outputs are determined by the current state and the inputs. FIG. 15 illustrates a block diagram of the preferred embodiment of the bus arbitration control circuit 370 of the present invention. As illustrated, the bus arbitration control circuit 370 comprises an input register 490 and a programmable logic sequencer 492. The input register 490 receives the three bus requests from the bus masters on the BUSREQA line 380A, the BUSREQB line 382A and the BUSREQC line 384A; the combined bus busy signal on the BUSBUSY line 414; the refresh request signal on the REFREQ line 376A; the DMA request signal on the DMAREQ line 374A; the interrupt pending signal on the IPEND line 412; the GAG signal on the GAG line 372E; the hold acknowledge signal on the HLDA line 372B; the first watchdog timer output signal on the TIMER1 line 464; and the second watchdog timer output signal on the TIMER2 line 474. The foregoing signals are latched into the input register 490 on each occurrence of an arbitration circuit clock that is provided as an input to the input register 490 and the programmable logic sequencer 492 via a clock input line 496. In preferred embodiments of the present invention, the arbitration circuit clock on the clock input line 496 has a rate of 16 MHz.

The input register 490 provides output signals that correspond one-to-one with the signals on its inputs. The output signals from the input register 490 are provided as inputs to the programmable logic sequencer 492. It can be seen that the signals latched into the input register 490 on one clock edge will be available as inputs to the programmable logic sequencer 492 on the corresponding clock edge one clock cycle later (i.e., 62.5 nanoseconds later).

The programmable logic sequencer 492 provides the three bus grant signals on the BUSGRNTA line 380B, the BUSGRNTB line 382B and the BUSGRNTC line 384B; the refresh grant signal on the REFGRNT line 376B; the DMA grant signal on the DMAGRNT line 374B; the hold request signal on the HOLD line 372A; the first watchdog timer enable signal on the TIMER1ENABLE line 462; and the second watchdog timer enable signal on the TIMER2ENABLE line 470. The signals on the output lines depend upon the current state of the bus arbitration control circuit 370, as represented within the programmable logic sequencer 492, and on the signals provided as inputs to the programmable logic sequencer 492 from the input register 490. In the preferred embodiment of the present invention, the programmable logic sequencer 492 is a commercially available PLS168B field programmable logic sequencer available from Signetics, 811 East Arques Avenue, Sunnyvale, Calif. 94088-3409. The programmable logic sequencer 492 includes an internal state register to latch and hold the current state of the bus arbitration control circuit 370. Additional details regarding the programming and operation of the exemplary programmable logic sequencer 492 can be found in the product specification information available from Signetics.

Figure 16:
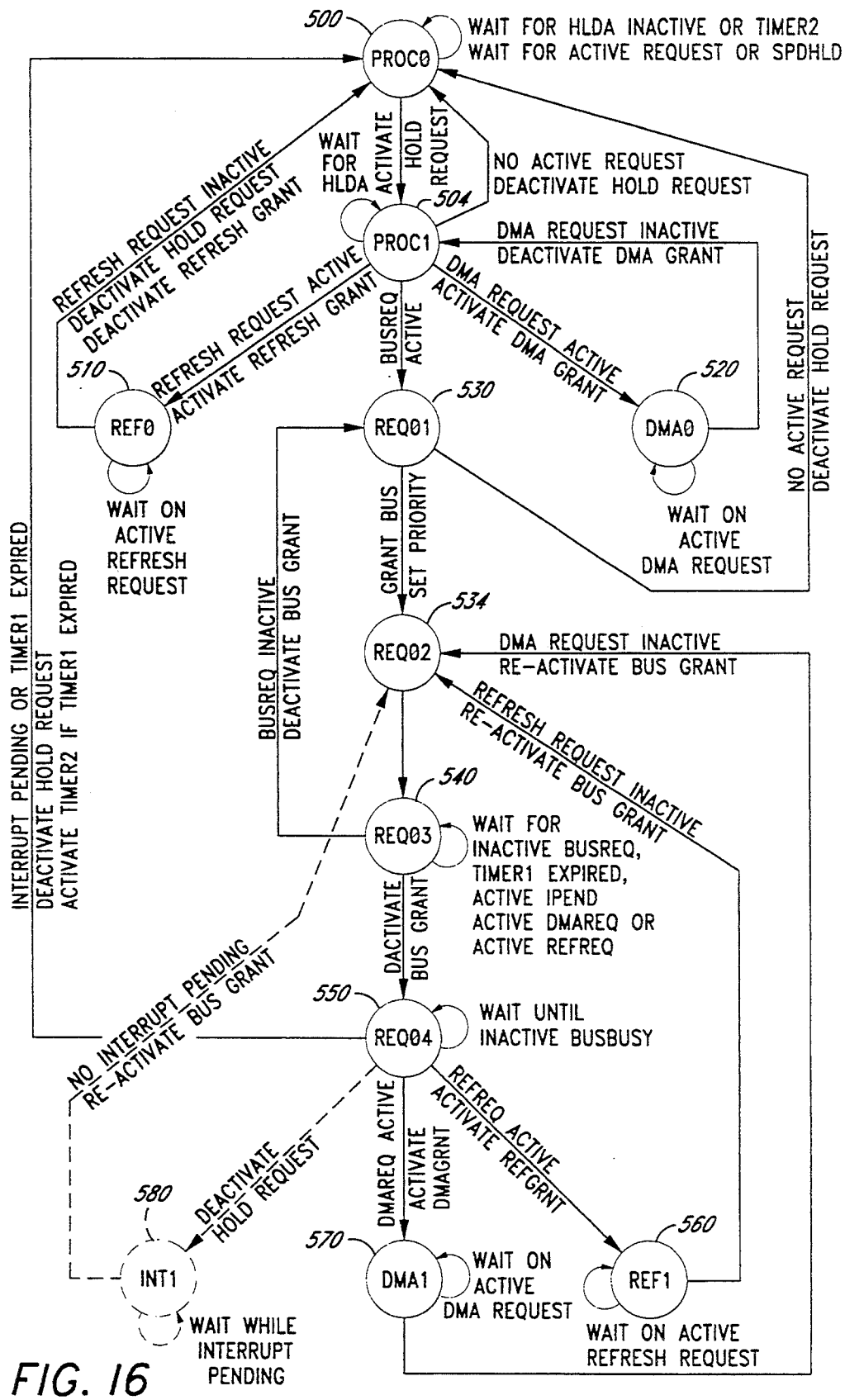
FIG. 16 is a state diagram of the bus arbitration control circuit of the present invention.

FIG. 16 is a state diagram of the bus arbitration control circuit 370 showing the various states of the bus arbitration control circuit 370 and the effect of the various inputs to cause the bus arbitration control circuit 370 to change to another state. As illustrated in FIG. 16, the bus arbitration control circuit 370 includes a first state 500 designated as PROC0. The PROC0 state 500 is the primary operating state of the bus arbitration control circuit 370 and represents the condition where there are no refresh requests, DMA requests or bus requests pending. Furthermore, the speed hold signal on the SPDHLD line 480 is inactive. Thus, the microprocessor 310 has control of the shared bus 318 and executes instructions and transfers data without sharing the bus with the other devices.

When one of the requests becomes active or the speed hold signal is activated, the bus arbitration control circuit 370 changes from the PROC0 state 500 to a second state 504 designated as PROC1. In the PROC1 state 504, the bus arbitration control circuit 370 activates the hold request signal on the HOLD line 372A and then waits until the hold acknowledge signal is activated on the HLDA line 372B. When the hold acknowledge signal becomes active, then the bus arbitration control circuit 370 changes state in accordance with the current state and priority of the pending requests. If no request is active when the hold acknowledge signal becomes active, the bus arbitration control circuit 370 will return to the PROC0 state 500 where it deactivates the hold request signal to allow the microprocessor to resume operation on the shared bus 318. This may happen, for example, if a pending bus request from one of the bus masters is deactivated by the bus master prior to the occurrence of the active hold acknowledge signal. Another likely source of this occurrence is if the change from the PROC0 state 500 to the PROC1 state 504 was caused by the activation of the speed hold signal on the SPDHLD line 480. Thus, it can be seen that with the speed hold signal active, the bus arbitration control circuit 370 will enter the PROC1 state 504, activate the hold request signal, wait for the hold acknowledge signal, and return to the PROC0 state 500. If the speed hold signal remains active, the bus arbitration control circuit 370 will return to the PROC1 state 504 where the process is repeated, thus effectively slowing down the operation of the microprocessor 310 on the shared bus 318.

Returning to the PROC1 state 504, if one of the requests remains pending when the hold acknowledge signal is activated by the microprocessor 310, the bus arbitration control circuit 370 will change to a state associated with the highest priority request. For example, if the refresh request signal is active on the REFREQ line 376A, the bus arbitration control circuit 370 will change to a state 510 designated as REF0. In the REF0 state 510, the bus arbitration control circuit 370 activates the refresh grant signal on the REFGRNT line 376B. The bus arbitration control circuit 370 remains in the REF0 state 510 until the refresh request signal is deactivated, at which time it returns to the PROC0 state 500 as it deactivates the hold request signal to the microprocessor 310. In the PROC0 state 500, the bus arbitration control circuit 370 waits for the next active request or activation of the speed hold signal, as discussed above. In the event that a request signal or the speed hold signal is activated immediately, the bus arbitration control circuit 370 will remain in the PROC0 state 500 at least until the microprocessor 310 deactivates the hold acknowledge signal on the HLDA line 372B before changing to the PROC1 state 504.

Returning again to the PROC1 state 504, if the refresh request signal is not active, and the DMA request signal on the DMAREQ line 374A is active when the hold acknowledge signal is activated by the microprocessor 310, then the bus arbitration control circuit 370 will change to a state 520 designated as DMA0. In the DMA0 state 520, the bus arbitration control circuit 370 activates the DMA grant signal on the DMAGRNT line 374B. The bus arbitration control circuit 370 remains in the DMA0 state 520 until the DMA request signal is deactivated, at which time the bus arbitration control circuit 370 returns to the PROC1 state 504 to await the next active request.

It should be noted that the bus arbitration control circuit 370 returns to the PROC1 state 504 rather than the PROC0 state 500 following a DMA bus operation in the DMA0 state 520. This feature of the preferred embodiment has an advantage in preventing a high speed DMA controller (i.e., the DMA controller 340 programmed for high speed data transfers) from retaining control of the shared bus 318. Such high speed controllers typically are programmed in an AT-type computer system to transfer one byte of data and then relinquish the shared bus 318. Thereafter, the DMA controller monitors the DMA grant signal and, when it becomes inactive, re-activates the DMA request signal. Thus, if the bus arbitration control circuit 370 returned to the PROC0 state 500 after a DMA request, wherein the bus arbitration control circuit 370 waits for the deactivation of the hold acknowledge signal before changing to the PROC1 state 504, it is possible that a high speed DMA device will activate its DMA request as the bus arbitration control circuit 370 changes to the PROC1 state 504. Thus, a high speed DMA controller may effectively preclude a bus master from being granted control of the shared bus 318. By returning to the PROC1 state 504 after a DMA operation, a pending bus master request may be recognized before the DMA controller generates a DMA request signal. On the other hand, if no bus requests are pending when the bus arbitration control circuit 370 returns to the PROC1 state 504, the bus arbitration control circuit 370 will change to the PROC0 state 500 and deactivate the hold request so that the microprocessor 310 will deactivate the hold acknowledge signal. Thus, the high speed DMA controller will be able to re-activate its hold request signal.

Returning again to the PROC1 state 504, if both the refresh request and the DMA request signals are inactive and one the bus request signals is active (i.e., BUSREQA, BUSREQB or BUSREQC is active), the bus arbitration control circuit 370 will change to a state 530 designated as REQ01. In the state REQ01, the bus arbitration control circuit 370 arbitrates all the pending bus requests and selects the bus master whose pending bus request has the highest current priority. Thereafter, the bus arbitration control circuit 370 changes to a state 534 designated as REQ02. As it changes from the REQ01 state 530 to the REQ02 state 534, the bus arbitration control circuit 370 sets the bus grant signal associated with the selected bus master. At the same time, the bus arbitration control circuit 370 stores a code corresponding to the new priority so that the bus master to which the control of the shared bus 318 is granted will have lowest priority during the next arbitration. For example, in the preferred embodiment of the bus arbitration control circuit 370 of the present invention, the following priority rotation is implemented:

| BUS GRANT | NEW PRIORITY | | |
|---|---|---|---|
| A | B | C | A |
| B | C | A | B |
| C | A | B | C | where the letter in the column under BUS GRANT represents the bus master to which the control of the shared bus 318 has been granted and the order of the letters in the three columns under NEW PRIORITY represents the order of priority. Thus, for example, when the BUS MASTER A 350 is granted control of the shared bus 318, the new priority will be such that the BUS MASTER B 352 will have the highest priority during the next arbitration, the BUS MASTER C 354 will have the next highest priority, and the BUS MASTER A 350 will have the lowest priority. Other priority rotation systems could also be used.

Furthermore, as the bus arbitration control circuit 370 changes to the REQ02 state 534 from the REQ01 state 530, it activates the first watchdog timer 460 via the TIMER1ENABLE line 462 to begin the predetermined time that a bus master is allowed to retain control of the shared bus 318.

The bus arbitration control circuit 370 remains in the REQ02 state 534 for one clock cycle and then changes to a state 540 designated as REQ03. While the bus arbitration control circuit 370 is in the REQ03 state 540, the bus grant signal corresponding to the bus master to which the control of the shared bus 318 was granted is maintained in its active state so that the bus master can transfer data on the shared bus 318. The bus arbitration control circuit 370 remains in the REQ03 state 540 until one of five signals changes its state. If the refresh request signal on the REFREQ line 376A is activated, the bus arbitration control circuit 370 will change to a state 550 designated as REQ04. As it changes to the REQ04 state 550, the bus arbitration control circuit 370 deactivates the bus grant signal to the selected bus master to inform the bus master that it must remove disable its bus drivers and relinquish control of the shared bus 318. The bus arbitration control circuit 370 remains in the REQ04 state 550 until the combined bus busy signal on the BUSBUSY line 414 is deactivated by the bus master, at which time the bus arbitration control circuit 370 changes to a state 560 designated as REF1. As the state of the bus arbitration control circuit 370 changes to the REF1 state 560, it activates the refresh grant signal on the REFGRNT line 376B. The bus arbitration control circuit 370 remains in the REF1 state 560 until the refresh request signal on the REFREQ line 376A is deactivated, at which time the bus arbitration control circuit 370 returns to the REQ02 state 534 as it activates the bus grant signal for the bus master previously having control of the shared bus 318. The bus arbitration control circuit 370 remains in the REQ02 state 534 for one clock cycle and then returns to the REQ03 state 540 where it remains as long as one of the five signals does not change.

In a manner similar to the activation of the refresh request signal, the activation of the DMA request signal on the DMAREQ line 374A while the bus arbitration control circuit 370 is in the REQ03 state 540 causes the bus arbitration control circuit 370 to change to the REQ04 state and to deactivate the bus grant signal to the currently active bus master. The bus arbitration control circuit 370 remains in the REQ04 state until the bus master deactivates the combined bus busy signal on the BUSBUSY line 414. When the bus busy signal is deactivated, the bus arbitration control circuit 370 changes to a state 570 designated as DMA1 as it activates the DMA grant signal on the DMAGRNT line 374B. The bus arbitration control circuit 370 remains in the DMA1 state 570 until the DMA controller 340 deactivates the DMA request signal, at which time the bus arbitration control circuit 370 returns to the REQ02 state 534 as it activates the bus grant signal to the previously active bus master. The bus arbitration control circuit 370 then returns to the REQ03 state 540 to wait while the bus master continues transferring data on the shared bus 318.

If the interrupt pending signal on the IPEND line 412 becomes active while the bus arbitration control circuit 370 is in the REQ03 state 540, the bus arbitration control circuit 370 will change to the REQ04 state 550 and will deactivate the bus grant signal to the current master. In the REQ04 state 550, the bus arbitration control circuit 370 will wait until the bus master deactivates the busy signal on the common BUSBUSY line 414. When the bus busy signal becomes inactive, the bus arbitration control circuit 370 deactivates the hold request signal on the HOLD line 372A and changes to the PROC0 state 500 wherein it waits for the deactivation of the interrupt pending signal on the IPEND line 412. As set forth above, the bus arbitration control circuit 370 will continue to honor refresh requests and DMA requests while the interrupt pending condition is true via the PROC1 state 504 and the REF0 state 510 or the DMA0 state 520. However, the active interrupt pending condition blocks a change to the PROC1 state 504 in response to a bus request from one of the bus masters. When the interrupt pending signal becomes inactive, the bus arbitration control circuit 370 will once again begin acknowledging bus requests from the bus masters. In the preferred embodiment described herein, the bus arbitration control circuit 370 processes any pending bus requests via the PROC1 state 504, the REQ01 state 530 and the REQ02 state 534 to the REQ03 state 540, as described above. Thus, the bus arbitration control circuit 370 re-arbitrates the priority of the requests from the bus masters, as described above. It should be understood that in this embodiment, the bus master that had control of the shared bus 318 prior to the occurrence of the interrupt now has the lowest priority during the arbitration. This feature of the preferred embodiment can be advantageously used by a bus master to gain control of the shared bus 318 from another bus master by generating an interrupt to the microprocessor 310 to effectively cause the bus arbitration control circuit 370 to re-arbitrate access to the shared bus 318 with the previously controlling bus master having the lowest priority.

In an alternative embodiment, rather than returning to the PROC0 state to wait for the microprocessor 310 to complete the interrupt processing, an interrupt processing state 580, designated as INT1 in dashed lines can be provided. The INT1 state 580 is similar to the REF1 state 560 and the DMA1 state 570 in that when the interrupt processing is completed, the bus arbitration control circuit 370 returns to the REQ02 state 534 wherein control of the shared bus 318 is returned to the bus master that had control prior to the interrupt.

If the predetermined time provided by the first watchdog timer 460 expires while the bus arbitration control circuit 370 is in the REQ03 state 540, the bus arbitration control circuit 370 will deactivate the bus grant signal to the bus master currently having control of the shared bus 318 and will change to the REQ04 state 550. At the same time as it deactivates the bus grant signal, the bus arbitration control circuit 370 activates the second watchdog timer signal via the TIMER2ENABLE line 470. After waiting for the bus master to deactivate the bus busy signal on the common BUSBUSY line 414, the bus arbitration control circuit 370 deactivates the hold request signal on the HOLD line 372A and changes to the PROC0 state 500. As it changes to the PROC0 state 500, the bus arbitration control circuit 370 resets the first watchdog timer 460 by deactivating the first timer enable signal on the TIMER1ENABLE line 462 so that it is ready to be re-initialized when the bus arbitration control circuit 370 next honors a bus request from one of the bus masters 350, 352, 354. While in the PROC0 state 500, the bus arbitration control circuit 370 will ignore any bus requests from the bus masters so long as the second watchdog timer signal on the TIMER2 line 474 is active. The bus arbitration control circuit 370 will continue to honor refresh requests and DMA requests, as described above.

When the predetermined time provided by the second watchdog timer 472 expires, the bus arbitration control circuit 370 will again honor any pending bus requests from the bus masters and will arbitrate the requests to grant control of the shared bus 318 to the bus master having the current highest priority request in the manner described above. Thus, it can be seen that the activation of the second watchdog timer 472 permits the microprocessor 310 to have sufficient time to process data without relinquishing the shared bus 318 to one of the bus masters 350, 352, 354.

Returning to the REQ03 state 540, if the bus master having control of the shared bus 318 deactivates its respective bus request signal to indicate that it has completed its bus transfers, and there is no active refresh request, DMA request or interrupt pending, and the TIMER1 signal from the first watchdog timer 360 is still active, then the bus arbitration control circuit 370 deactivates the bus grant signal associated with the bus master and returns to the REQ01 state 530 wherein it determines whether there are any active bus requests. If there are active requests, it arbitrates the requests to select the request having the highest current priority, issues the bus grant signal to the bus master having the highest current priority, and changes to the REQ02 state 534. After waiting in the REQ02 state 534 for one arbitration clock cycle, the bus arbitration control circuit 370 changes to the REQ03 state 540 where it waits for one of the changes of condition, as described above. If there are no pending bus requests when the bus arbitration control circuit 370 returns to the REQ01 state 530, it will return to the PROC0 state 500 to resume operation as described above. As the bus arbitration control circuit 370 returns to the PROC0 state 500 from the REQ01 state 530, it resets the first watchdog timer 460 by deactivating the first watchdog timer enable signal on the TIMER1ENABLE line 462. As discussed above, the first watchdog timer 460 will be re-initiated when the bus arbitration control circuit 370 changes to the REQ02 state 534 when it next honors a bus request from one of the bus masters 350, 352, 354.

As briefly discussed above, the microprocessor 310 provides a GAG signal on the GAG line 372E to the bus arbitration control circuit 370. The status of the GAG signal is monitored by the bus arbitration control circuit 370 in the PROC0 state 500 and in the PROC1 state 504. If the GAG signal is active while the bus arbitration control circuit 370 is in the PROC0 state 500, the bus arbitration control circuit 370 will not change to the PROC1 state 504 in response to an active bus request signal from one of the bus masters 350, 352, 354. Similarly, if the GAG signal becomes active while the bus arbitration control circuit 370 is in the PROC2 state 504, the bus arbitration control circuit 370 will not change states to the REQ01 state 530. Rather, if no refresh request or DMA request is pending, the bus arbitration control circuit 370 will return to the PROC0 state 500.

Although not shown, the preferred embodiment of the present invention includes a reset signal input by which the bus arbitration control circuit 370 is initialized to the PROC0 state 500 with the two timers and the bus grants in their respective inactive states.

One aspect of the present invention is that the computer system 300 is compatible with the conventional computer system 100 because the GAG signal can be activated to disable the bus masters. When so disabled, the bus arbitration control circuit 370 responds to the refresh requests and DMA requests in a manner substantially similar to the known conventional systems.

Although described above in connection with the transfer of data to and from the system memory 314 via the shared bus 318, it will be understood by those skilled in the art that the present invention is applicable to the transfer of data from a bus master to another slave device on the shared bus 318.

A particular embodiment of the present invention has been described above. Although the invention has been described with reference to this specific embodiment, the description is intended to be illustrative of the invention and is not intended to be limiting. Various modifications and applications may occur to those skilled in the art without departing from the true spirit and scope of the invention as defined in the appended claims.

What is claimed is:

1. A bus arbitration control circuit for a computer system having a microprocessor, a system memory and a shared bus between the microprocessor and the system memory, said computer system further including a memory refresh control circuit that uses said shared bus to periodically refresh said system memory and a plurality of peripheral controllers that utilize said shared bus to transfer data between said system memory and a plurality of peripheral devices, said bus arbitration control circuit arbitrating control of said shared bus between peripheral controllers having active requests to access said shared bus, said arbitration control unit comprising:

a plurality of inputs that receive requests for access to said shared bus from said peripheral controllers and said memory refresh control circuit; and a logic sequencer responsive to said plurality of inputs, said logic sequencer causing a first peripheral controller having control of said shared bus to relinquish control and temporarily transfer control of said shared bus to said memory refresh control circuit when said refresh control circuit requests access to said shared bus, said logic sequencer always automatically returning control of said shared bus to said first peripheral controller when said refresh control circuit has completed refreshing said memory so that said first peripheral controller can complete its operation without an arbitration of priority between said first peripheral controller and other peripheral controllers having active bus requests.

* * * * *

UNITED STATES PATENT AND TRADEMARK OFFICE
CERTIFICATE OF CORRECTION

PATENT NO. : 5,438,666
DATED : August 1, 1995
INVENTOR(S) : Thomas W. Craft et al.

It is certified that error appears in the above-indentified patent and that said Letters Patent is hereby corrected as shown below:

On the cover page, Item [*] Notice

"The portion of this patent subsequent to Jan. 22, 2008 has been disclaimed."

with the following notice:

--The term of this patent shall not extend beyond the expiration date of Pat. No. 4,987,529.--

Signed and Sealed this

Fifth Day of March, 1996

Attest:

BRUCE LEHMAN

Attesting Officer

Commissioner of Patents and Trademarks